(12) United States Patent
Cambot et al.

(10) Patent No.: US 7,899,810 B2
(45) Date of Patent: *Mar. 1, 2011

(54) RELATIONAL DATABASE ACCESS SYSTEM USING SEMANTICALLY DYNAMIC OBJECTS

(75) Inventors: Jean-Michel Cambot, Montpellier (FR); Bernard Liautaud, Paris (FR)

(73) Assignee: Business Objects Software Ltd., Dublin (IE)

( * ) Notice: Subject to any disclaimer, the term of this patent is extended or adjusted under 35 U.S.C. 154(b) by 75 days.

This patent is subject to a terminal disclaimer.

(21) Appl. No.: 11/671,449

(22) Filed: Feb. 5, 2007

(65) Prior Publication Data

US 2007/0130136 A1    Jun. 7, 2007

Related U.S. Application Data

(63) Continuation of application No. 10/402,652, filed on Mar. 27, 2003, now Pat. No. 7,181,435, and a continuation of application No. 09/812,482, filed on Mar. 19, 2001, now Pat. No. 6,578,027, and a continuation of application No. 08/699,740, filed on Aug. 20, 1996, now Pat. No. 6,247,008, and a continuation of application No. 07/800,506, filed on Nov. 27, 1991, now Pat. No. 5,555,403.

(51) Int. Cl.
*G06F 7/00* (2006.01)

(52) U.S. Cl. .................. 707/713; 707/714; 707/716; 707/718

(58) Field of Classification Search .......... 707/713, 707/714, 716, 718, 999.2
See application file for complete search history.

(56) References Cited

U.S. PATENT DOCUMENTS

| | | | |
|---|---|---|---|
| 4,445,171 | A | 4/1984 | Neches |
| 4,506,326 | A | 3/1985 | Shaw et al. |
| 4,543,630 | A | 9/1985 | Neches |
| 4,688,195 | A | 8/1987 | Thompson et al. |
| 4,751,635 | A | 6/1988 | Kret |
| 4,769,772 | A | 9/1988 | Dwyer |
| 4,811,207 | A | 3/1989 | Hikita et al. |
| 4,814,979 | A | 3/1989 | Neches |
| 4,829,423 | A | 5/1989 | Tennant et al. |

(Continued)

FOREIGN PATENT DOCUMENTS

EP    0 120 185 A2    10/1984

(Continued)

OTHER PUBLICATIONS

Czejdo, Using an ER Query and Update Interface for Rapid Prototyping of Hypertext Systems, Twenty-Third Annual Hawaii International Conference on System Science (IEEE Computer Society Press 1990).

(Continued)

*Primary Examiner*—Tim T. Vo
*Assistant Examiner*—Anh Tai V Tran
(74) *Attorney, Agent, or Firm*—Cooley LLP

(57) ABSTRACT

A relational database access system and method provides a new data representation and a query technique which allows information system end users to access (query) relational databases without knowing the relational structure or the structure query language (SQL). The present invention utilizes semantically dynamic objects.

15 Claims, 39 Drawing Sheets

U.S. PATENT DOCUMENTS

| | | | |
|---|---|---|---|
| 4,905,163 | A | 2/1990 | Garber et al. |
| 4,930,071 | A | 5/1990 | Tou et al. |
| 4,939,689 | A | 7/1990 | Davis et al. |
| 4,965,743 | A | 10/1990 | Malin et al. |
| 4,967,337 | A | 10/1990 | English et al. |
| 4,970,658 | A | 11/1990 | Durbin et al. |
| 4,975,840 | A | 12/1990 | DeTore et al. |
| 5,006,978 | A | 4/1991 | Neches |
| 5,179,698 | A | 1/1993 | Bachman et al. |
| 5,233,513 | A * | 8/1993 | Doyle .......................... 705/7 |
| 5,261,093 | A | 11/1993 | Asmuth |
| 5,263,167 | A | 11/1993 | Conner, Jr. et al. |
| 5,276,870 | A | 1/1994 | Shan et al. |
| 5,291,583 | A | 3/1994 | Bapat |
| 5,295,256 | A | 3/1994 | Bapat |
| 5,297,279 | A | 3/1994 | Bannon et al. |
| 5,317,742 | A | 5/1994 | Bapat |
| 5,386,556 | A | 1/1995 | Hedin et al. |
| 5,418,943 | A | 5/1995 | Borgida et al. |
| 5,418,950 | A | 5/1995 | Li et al. |
| 5,421,008 | A * | 5/1995 | Banning et al. ................ 707/4 |
| 5,426,781 | A | 6/1995 | Kaplan et al. |
| 5,428,737 | A | 6/1995 | Li et al. |
| 5,428,776 | A | 6/1995 | Rothfield |
| 5,454,106 | A | 9/1995 | Burns et al. |
| 5,535,389 | A | 7/1996 | Elder et al. |
| 5,550,971 | A | 8/1996 | Brunner et al. |
| 5,555,403 | A | 9/1996 | Cambot et al. |
| 5,767,848 | A | 6/1998 | Matsuzaki et al. |
| 6,002,798 | A | 12/1999 | Palmer et al. |
| 6,185,553 | B1 | 2/2001 | Byrd et al. |
| 6,247,008 | B1 | 6/2001 | Cambot et al. |
| 6,356,903 | B1 | 3/2002 | Baxter et al. |
| 6,578,027 | B2 | 6/2003 | Cambot et al. |

FOREIGN PATENT DOCUMENTS

| | | | |
|---|---|---|---|
| EP | 0 439 937 | A2 | 8/1991 |
| EP | 0455 447 | A2 | 11/1991 |

OTHER PUBLICATIONS

Dahl et al., Visual Programming as an Interface Between Program and User, 1989 IEEE Workshop on Visual Languages (1989).

Harris, User Oriented Data base Query with the Robot Natural Language Query System, Third International Conference on Very Large Data Bases (Oct. 1997).

Howard et al., User Interface for Structural Engineering Relational Data Base, 4 Engineering with Computers 239-249 (1988).

Kato et al., A Visual Interface for an Object-Oriented Query in Relational Databases, 19 Systems and Computers in Japan 62-69 (1988).

Mainguenaud et al., Definition of Cigales: A Geographical Information System Query Language, Database and Expert Systems Applications: Proceeding of the International Conference in Vienna, Austria, pp. 275-280 (1990).

Miastkowski et al., Paradox 3: Neither Enigman nor Riddle, BYTE, First Impressions 109-11 (Feb. 1989).

Press Release, "Brio Technology, Inc. Ships DataPrism, A Macintosh Based Graphical Query Tool For Relational Databases," Released on Sep. 28, 1990, published by Brio Technology, Inc., 3 pages.

Rizzo & Strauss, Darwin: Merrill Lynch Develops a New Workstation Based on Windows 2.03, Microsoft Systems Journal, 1988.

Zloof, Query by Example, AFIPS Conference Proceedings: 1975 National Computer Conference (AFIPS Press 1975).

Blum et al., "An Intelligent Navigational Assistant for a Decision Resource Database," Proceedings of the Third Annual Expert Systems in Government Conference, Washington, DC (1987) 9 pages.

Blum et al., "Navigating through Complex Databases: A Case Study," Application of Artificial Intelligence to Command & Control Systems, Peter Peregrinus Ltd. (1988) pp. 380-396.

Bucy et al., "Ease-of-Use Features in the Texas Instruments Professional Computer", Proceedings of the IEEE, 72(3):269-282, Mar. 1984.

Howard et al., User Interface for Structural Engineering Relational Data Base, 4 Engineering with Computers 239-249 (1988).

Cambot, SkipperSQL, Relational Infocenter Tool for Oracle, Version 2.0, Database Administrator Manual, 133 pages.

Cambot, SkipperSQL, Relational Infocenter Tool for Oracle, Version 2.0, User's Manual, 90 pages.

Cambot, SkipperSQL, Relational Infocenter Tool for Oracle, Version 2.0.6 Infocenter Manager's Guide, 135 pages.

Cambot, SkipperSQL, Relational Infocenter Tool for Oracle, Version 2.0.6 User's Guide, 87 pages.

Cammarata, "An Intelligent Information Dictionary for the Semantic Manipulation of Relational Databases," Advances in Database Technology-EDBT '88, International Conf. on Extending Database Technology, Venice, Italy, Mar. 14-18,1988 Proc., 18 pages.

DataPrism, A Database Query Tool, 1.7 Update, Version 1.1 for Apple Macintosh Computers, Brio Technology, Inc. (1991) 100 pages.

DataPrism, A Database Query Tool, Reference Manual, 1.1 Update, Version 1.1 for Apple Macintosh Computers, Brio Technology, Inc. (1991) 25 pages.

DataPrism, A Database Query Tool, Reference Manual, Version 1.0 for Apple Macintosh Computers, Brio Technology, Inc. (1990) 90 pages.

DataPrism, A Database Query Tool, User's Manual, Version 1.0 for Apple Macintosh Computers, Brio Technology, Inc. (1990) 69 pages.

Date, "An Introduction to Database Systems", vol. I, 4th Edition, Addison Wesley (1986) 649 pages.

El-Sharkawi et al., "The Architecture and Implementation of ENLI: Example-Based Natural Language-Assisted Interface," PARBASE-90 International Conference on Databases, Parallel Architectures and Their Applications, IEEE Computer Society Press, (1990) pp. 430-432.

Metaphor Database Administration—DBA Tool, Metaphor Computer Systems, Inc. (1989) 19 pages.

Metaphor Database Administration, Release 9.0, Document No. 390-05 89-1020-06, Metaphor Computer Systems, Inc. (1989) 549 pages.

Metaphor Query Tutorial, Release 6.0, Document No. 590-01 89-2010-01, Metaphor Computer Systems (1987) 72 pages.

Metaphor Query Tutorial, Second Ed., Metaphor Computer Systems, Inc. (1990) 41 pages.

Oracle for IBM Manuals, vol. One: Installation Guide SQL/UFI Tutorial, Oracle Corporation, Menlo Park, CA (1982-1983) 126 pages.

Oracle for IBM Manuals, Volume Two: Programmer's Guide, DBA Guide, SQL/UFI Reference Error Messages, Database Administrators Guide, Oracle Corporation, Menlo Park, CA (1982-1984) 111 pages.

Oracle for Macintosh Reference Version 1.2, Oracle Corporation (1990) 505 pages.

Oracle SQL*Plus® Reference Guide Version 2.0, Oracle Corporation, Belmont, CA 1986-1987) 39 pages.

Stern et al., "A Menu-Based Natural Language Interface to A Large Database", Texas Instruments Incorporated, Dallas, TX, NAECON: National Aerospace & Electronics Conference, Dayton, OH, May 20-24, 1985, pp. 1356-1363.

Stone et al., "ArchiVISTA: A New Horizon in Providing Access to Visual Records of the National Archives of Canada" Library Trends 38(4):737-750, Spring 1990.

Tennant et al., "Menu-based Natural Language Understanding" 21st Annual Meeting of the Association for Computational Linguistics, MIT, Jun. 1983, pp. 151-158.

Tennant et al., "Software Innovations for the Texas Instruments Explorer Computer" Proceedings of the IEEE, 73(12):1771-1790 (Dec. 1985).

Texas Instruments, Explorer Natural Language Menu System Technical Report, Texas Instruments Incorporated, Austin, TX, Jul. 1985, 20 pages.

Thompson et al., "A Toolkit for Building 'Menu-Based Natural Language' Interfaces", ACM Annual Conference, Denver, CO, Oct. 14-16, 1985, 10 pages.

Thompson et al., "Building Usable Menu-Based Natural Language Interfaces to Databases", Proceedings of the Ninth International Conference on Very Large Data Bases, Florence, Italy, Oct. 31-Nov. 2, 1983, pp. 43-55.

Thompson, "Using Menu-Based Natural Language Understanding to Avoid Problems Associated with Traditional Natural Language Interfaces to Databases", Dissertation Graduate School of The University of Texas at Austin, May 1984, 119 pages.

Workstation Tools Training, Metaphor Computer Systems, (1988) 92 pages.

Fishman et al., D.H. "Iris: An Object-Oriented Database Management System," ACM Transactions on Office Information Systems, vol. 5, No. 1, Jan. 1987, pp. 48-69.

Muscle on the Mac—Andyne Computing Offers Powerful Graphical Interface Database Advancements, Product Watch/Brian O'Connell, DEC Professional, Andyne Computing Ltd., Kingston, Ontario, Canada.

Rizzo & Strauss, "Darwin: Merrill Lynch Develops a New Workstation Based on Wimdows 2.03", Microsoft Systems Journal, 1988.

Kroenke, David M. "Business Modeling with Semantic Objects," Data Based Advisor, vol. 12, No. 12, pp. 1-4, Dec. 1994.

S. Dahl et al., "Visual Programming as an Interface Between Program and User", 1989 IEEE Workshop on Visual Languages (1989).

Czejdo, B., "Using an ER Query and Update Interface for Rapid Prototyping of Hypertext Systems," Twenty-Third Annual Hawaii International Conference on System Science (IEEE Computer Society Press 1990).

Harris, L.R., "User Oriented Data base Query with the Robot Natural Language Query System", Third International Conference on Very Large Data Bases (Oct. 1997).

Howard et al., C. "User Interface for Structural Engineering Relational Data Base", 4 Engineering with Computers 239-49 (1988).

"QBE/OBE: A language for Office and Business Automation," IEEE (May 1981).

Miastkowski et al. S., Paradox 3: Neither Enigman nor Riddle, BYTE, First Impressions 109-11 (Feb. 1989).

Whang et al.,"Office-by-Example: An Integrated Office System and Database Manager", 5 ACM Transactions on Office Information Systems 393-427 (1987).

"Query by Example", M.M. Zloof, AFIPS Conference Proceedings: 1975 National Computer Conference (AFIPS Press 1975).

M.M. Zloof, "Office-by-Example: A Basic Language that Unifies Data and Word Processing and Electronic Mail", 21 IBM Sys. J. 272 (1982).

"Definition of Cigales: A Geographical Information System Query Language", Database and Expert Systems Applications: Proceeding of the International Conference in Vienna, Austria (1990).

Kato et al. "A Visual Interface for an Object-Oriented Query in Relational Databases", 19 Systems and Computers in Japan 62-69 (1988).

Data Prism Reference Manual, A Database Query Tool, Version 1.0 for Apple Macintosh Computers, 1990, published by Brio Technology, Inc., 90 pages.

Data Prism User's Guide, A Database Query Tool, Version 1.0 for Apple Macintosh Computers, 1990, published by Brio Technology, Inc., 61 pages.

Data Prism, A Database Query Tool, 1991, published by Brio Technology, Inc., 2 pages.

Data Prism, "This Picture is Worth Precisely 237 Words . . . of SQL," published by Brio Technology, Inc., 1990, 4 pages.

IBM Data Interpretation System General Information, Sep. 1991, published by IBM, 105 pages.

Press Release, "Brio Technology, Inc. Ships DataPrism, A Macintosh Based Graphical Query Tool For Relational Databases," Released on Sep. 28, 1990, published by Brio Technology, Inc., 3 pages.

Coffee, "PC Environments Automate Applications," PC Week/Reviews, Jun.4, 1990, pp. 95 and 99.

Core International, "Installing NetWare is as Easy as Taking a Drive Out of a Box . . . ," PC Week/Application Development, May 15, 1989, pp. 56.

Higgins, "Metaphor Extends Reach of Its DBMS With IBM Host Links," PC Week, Jul. 31, 1989, pp. 39 and 41.

LaPlante, "IBM Rolls Out Database Software for Executives," Inforworld, V. 11, Issue 21, May 22, 1989, pp. 5.

Machrone, "Object Oriented: Old Wine New Bottles?," PC Magazine, May 16, 1989, pp. 65-66.

Meador, "Data Bases That Put the Business First," Financial and Accounting Systems, Fall 1990, pp. 34-40.

O.R, "Un generateur de requete SQL pour bases do donne es Oracle," LeMonde InformaTique, Nov. 19, 1990, pp. 19.

Strapko, "Knowledge Management A Fit With Expert Tools," Software Magazine, Nov. 1990, pp. 63-66.

Wernhart, "The HIBOL-2 Environment: A Basis for Visual Programming of Business Objects," J. System Software, V. 12, 1990, pp. 157-165.

Wexler, "IBM ships decision tool," Computerworld, Oct. 2, 1989, pp. 23 and 27.

Zloof, "An Experimental Approach to Office Automation: Office by Example," SEAS AM83 Session Report, Sep. 26, 1983, pp. 11-29.

Schlatter, et al. "The Business Object Management System," IBM Systems Journal, vol. 33 No. 2, 1994, pp. 239-263.

Czejdo, B., et al., "Integration of Database Systems and Smalltalk," 1991 Symposium on Applied Computing, IEEE Computer Soc. Press, 1991, pp. 393-402.

Siav, K. L., et al., "Visual Knowledge Query Language as a Front-end to Relational Systems," Proceedings of the 15th Annual International Computer Software and Applications Conference, IEEE Computer Society Press, 1991, pp. 373-378.

Siav, K. L., et al., "Visual Knowledge Query Language as a Front-end to Relational Systems," Proceedings of the 15th Annual International Computer Software and Applications Conference, IEEE Computer Society Press, 1991, pp. 373-378.

* cited by examiner

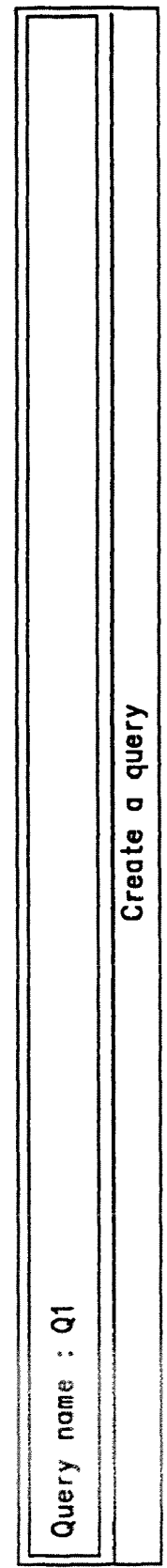
FIG. 2

| ACCEPT (CtrlEnd) | CANCEL (Escape) | HELP (F1) |

Query : Q1 (5/09/91 a 19:25) 6 line(s)

| CUSTOMER | | SALES_REVENUE |
|---|---|---|
| AVA | GARDNER 606 06060 | 36089 |
| ORSON | WELLS 565 65656 | 27614 |
| JACK | NICHOLSON 234 56790 | 9414 |
| KEVIN | COSTNER 566 77890 | 2000 |
| HENRY | FONDA 666 66666 | 1500 |
| GROUCHO | MARX 234 56412 | 132 |

Display query result

*FIG. 24*

```
ACCEPT (CtrlEnd)   CANCEL (Escape)   COLORS (F10)   HELP (F1)

F       D            I          B
REM DEMO
SELECT  CUSTOMERS.CUST_FRST_NAME,customers.cust_name,customers.cust_ph
        sum(items.item_price*order_lines.quant),'|'
FROM    CUSTOMERS,
        ITEMS,
        ORDER_LINES,
        ORDERS
WHERE   ITEMS.ITEM_ID=ORDER_LINES.ITEM_ID
AND     CUSTOMERS.CUST_ID=ORDERS>ORDER_CUST
AND     ORDERS.ORDER_ID=ORDER_LINES.ORDER_ID
AND     (
        CUSTOMERS.CUST_CITY = 'MALIBU'
GROUP BY C:\SK206US\DEMO\Q1.SQL   (597 oct)  1:1
```

FIG. 25

| ACCEPT (CtrlEnd) | CANCEL (Escape) | HELP (F1) |
|---|---|---|

Query : Q2 (6/09/91 a 09:24) 16 line(s)

| ITEM_NAME | SALES_REVENUE |
|---|---|
| 2 CV | 660 |
| BUGATTI COLLEC. | 12708 |
| CADILLAC 53 | 1000 |
| CHEVROLET CHEVY | 16830 |
| DIAMLER BENZ | 87864 |
| FERRARI | 4444 |
| JAGUAR | 4705 |
| JEEP | 2000 |
| LIMOUSINE | 20000 |
| OLDSMOBILE | 62768 |
| PICKUP | 1000 |
| PONTIAC | 42363 |
| ROLLS ROYCE 1 | 172800 |
| ROLLS ROYCE 2 | 3138 |
| SPITFIRE | 18382 |
| STATION WAGON | 1500 |

Display query result

FIG. 27

```
┌─────────────────────────────────────────────────────────────────────┐
│ ACCEPT  (CtrlEnd)   CANCEL  (Escape)   COLORS (F10)      HELP (F1)  │
├─────────────────────────────────────────────────────────────────────┤
│ ┌─┐                          ┌─ EDIT ─┐                             │
│ │ │  ┌──────────────────────────────────────────────────────────┐   │
│ │ │  │ ← ┌──────────────────────────────────────────────────┐ → │ △ │
│ │ │  │   └──────────────────────────────────────────────────┘   │   │
│ │ │  │  F        D         I         B                   □      │   │
│ │ │  │ REM DEMO                                                 │   │
│ │ │  │ SELECT  ITEMS.ITEM_NAME,'|',                             │   │
│ │ │  │         sum(items.item_price*order_lines.quant),'L'      │   │
│ │ │  │ FROM    ITEMS,                                           │   │
│ │ │  │         ORDER_LINES                                      │   │
│ │ │  │ WHERE   ITEMS.ITEM_ID=ORDER_LINES.ITEM_ID                │   │
│ │ │  │ GROUP BY                                                 │   │
│ │ │  │         ITEMS.ITEM_NAME                                  │   │
│ │ │  │                                                          │   │
│ │ │  │                                                        ▽ │   │
│ └─┘  └──────────────────────────────────────────────────────────┘   │
│                    C:\SK206US\DEMO\Q2.SQL  (226 oct)  1:1           │
└─────────────────────────────────────────────────────────────────────┘
```

*FIG. 28*

Query on Business Objects

Semantically Dynamic

Question: Sales Revenue by Customer

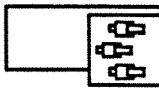

QUERY ENGINE

Click on Object Client
Click on Object Sales Revenue

SQL:
SELECT Customers.Frst_Name, Customers.Cust_Name,
       Customers.Phone,
       SUM(Items.Price*Order_Lines.Quant)
FROM   Order_Lines,
       Items,
       Customers,
       Orders
WHERE  Items.Item_Id=Order_Lines.Item_Id
       AND Customers.Cust_Id=Orders.Cust_Id
       AND Order_Lines.Order_Id=Orders.Order_Id
GROUP BY Customers.Frst_Name, Customers.Cust_Name,
         Customers.Phone Business Objects

FIG. 32

Query on Business Objects

Semantically Dynamic

Question: Sales Revenue by Customer

QUERY ENGINE

Click on Object Item
Click on Object Sales Revenue

SQL:
SELECT   Items.Item_Name,
         SUM(Items.Price*Order_Lines.Quant)

FROM     Order_Lines,
         Items

WHERE    Items.Item_Id=Order_Lines.Item_Id

GROUP BY Items.Item_Name

Business Objects

Local Data Analysis
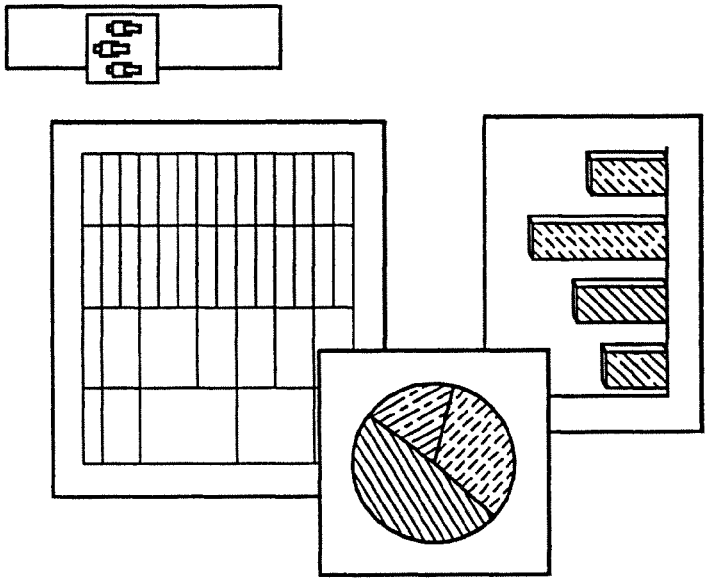
Horizontal and vertical browsing
Report Generation
 — Tables
 — Labels
 — Form Letters
Graph Generation
 — Bar-charts, 2D, 3D
 — Pie-charts
 — Sets of Points
Exploitation by Standard Packages:
 — Spreadsheets (Lotus, Excel,....)
 — Wordprocessors (Word,...)
 — Databases (dBase,....)
Business Objects 
FIG. 35

User-Friendly Interface
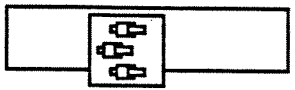
Easy-to-use interface that conforms to PC standards
- Multi-window
- Pull-down Menu
- Colors
All interaction possible using the mouse
Dialog entirely assisted
- Reduced errors
Extensive on-line help
National Language Support
English, French, ...
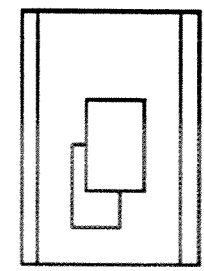
Business Objects 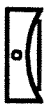
FIG. 36

RELATIONAL DATABASE ACCESS SYSTEM USING SEMANTICALLY DYNAMIC OBJECTS

BACKGROUND OF THE INVENTION

The present invention relates to information processing and more particularly to database access systems and methods such as a relational database access system and method.

Relational database systems are well known in the prior art, and include tabular structures and structured query languages used for database queries. To aid in an understanding of the present invention, a glossary of terms is included hereinbelow.

Relational database technology has made possible an independence between the way data is physically stored and the way it can be handled logically. Relational technology has been widely accepted in business, industry and engineering as valuable for storing data.

Heretofore, most of the advances provided by relational databases has been limited to those users who understand the mathematical principles of relational algebra. Querying a relational database implies a good knowledge of Structured Query Language (SQL) and a good understanding of relational data structures.

Numerous information systems that hide the complexity of SQL and relational databases are based on predefined query techniques. Using those solutions, users can specify parameters in order to add some conditions, but they can never change the meaning of the result. The semantic components of the SQL language (joins and group functions) are stored in the body of the predefined query. When an MIS staff builds an infocenter solution they create user-dedicated tables, relational views or predefined SQL queries accessible by menu triggers.

Usually, if end-users want to change the meaning of a query, either they have to ask the MIS staff to program another query or they have to program the SQL commands themselves. If they do so they will encounter many problems:

- the syntax of non procedural structured query language (in particular SQL) is complex.
- the data structure is not adapted to the users' everyday work. Relational databases store information as well as relational data such as keys.
- is the SQL query semantically correct? Although a query is syntaxically correct, results are not always reliable. SQL as a programmer language does not check the semantic of a query. A more concrete example is the SQL language producing totally a meaningless cross product. This represents a major limitation for end-user access to relational data.

Glossary

The following is a glossary of some of the terms used in these technologies.

Data: Raw facts or values which are physically recorded and which can be extracted and objectively verified Information: Anything learned from data, the "meaning" of the data.

Value: An amount of worth

Database: A computerized collection of data

Relational Database: A database in which all data are stored and organized in tables and in which each field containing a datum is equally accessible.

Relational Database Management System (RDBMS): The software environment supporting a Relational database.

Relational Database Terms:

Record: A collection of fields; the basic accessible element of a file.

Field: An elemental entity of a record.

Relation: An orderly arrangement of data in columns and rows; a table.

Attribute: A column of a relation, a field of a Tuple.

Tuple: A record of a relational database; one line or row of a table or relation.

Relational Structure: Set of Relations definitions

Business Objects specific Terms:

Infocenter: Environment in which the Users, without any technical knowledge, have "self-service" access to the information system, in a manner controlled by MIS staff.

Universe: An easy-to-understand partial or total representation of the database, designed for a particular application or group of users.

Business Objects: Objects corresponding to concepts close to the user's everyday business. They are defined by the Infocenter Manager and are the basic elements of a Universe.

Context: Set of logical equations linking tables (joins) providing a closed graph of table.

SUMMARY OF THE INVENTION

It is an object of the present invention to provide a new data representation and a new query technique which allow information systems end-users to access (query) database systems such as relational databases without knowing the relational structure or the SQL language. The present invention introduces the notion of semantically dynamic objects.

Other objects, features and advantages of the present invention will become apparent from the following detailed description when taken in conjunction with the accompanying drawings.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 2 depicts a User entering a Query Name.

FIG. 24 depicts a display of the result.

FIG. 25 depicts the SQL command generated automatically by a query engine according to the present invention.

FIG. 27 depicts a display of the answer of the query.

FIG. 28 depicts the SQL command generated by the Query Engine to translated the question.

FIGS. 32 depicts the Query on Business Objects aspects of being semantically dynamic as shown by query sales revenue by customer as contrasted with the SQL equivalent.

FIG. 35 depicts local data analysis according to the present invention.

FIG. 36 depicts the user friendly interface aspects according to the present invention.

DETAILED DESCRIPTION OF THE PREFERRED EMBODIMENTS

Figure 1:
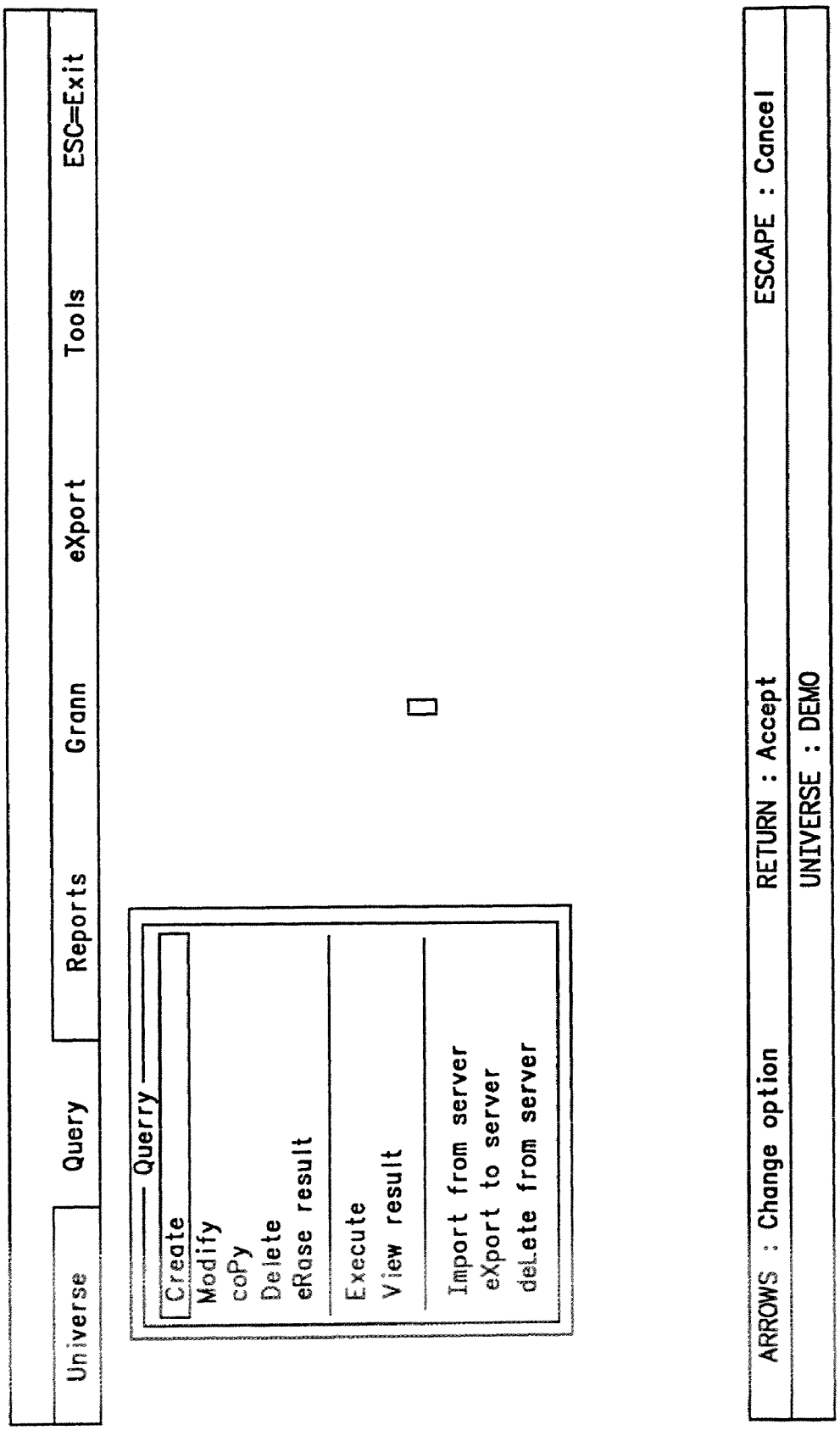
FIG. 1 depicts clicking on a Create Query Option.
Figure 1A:
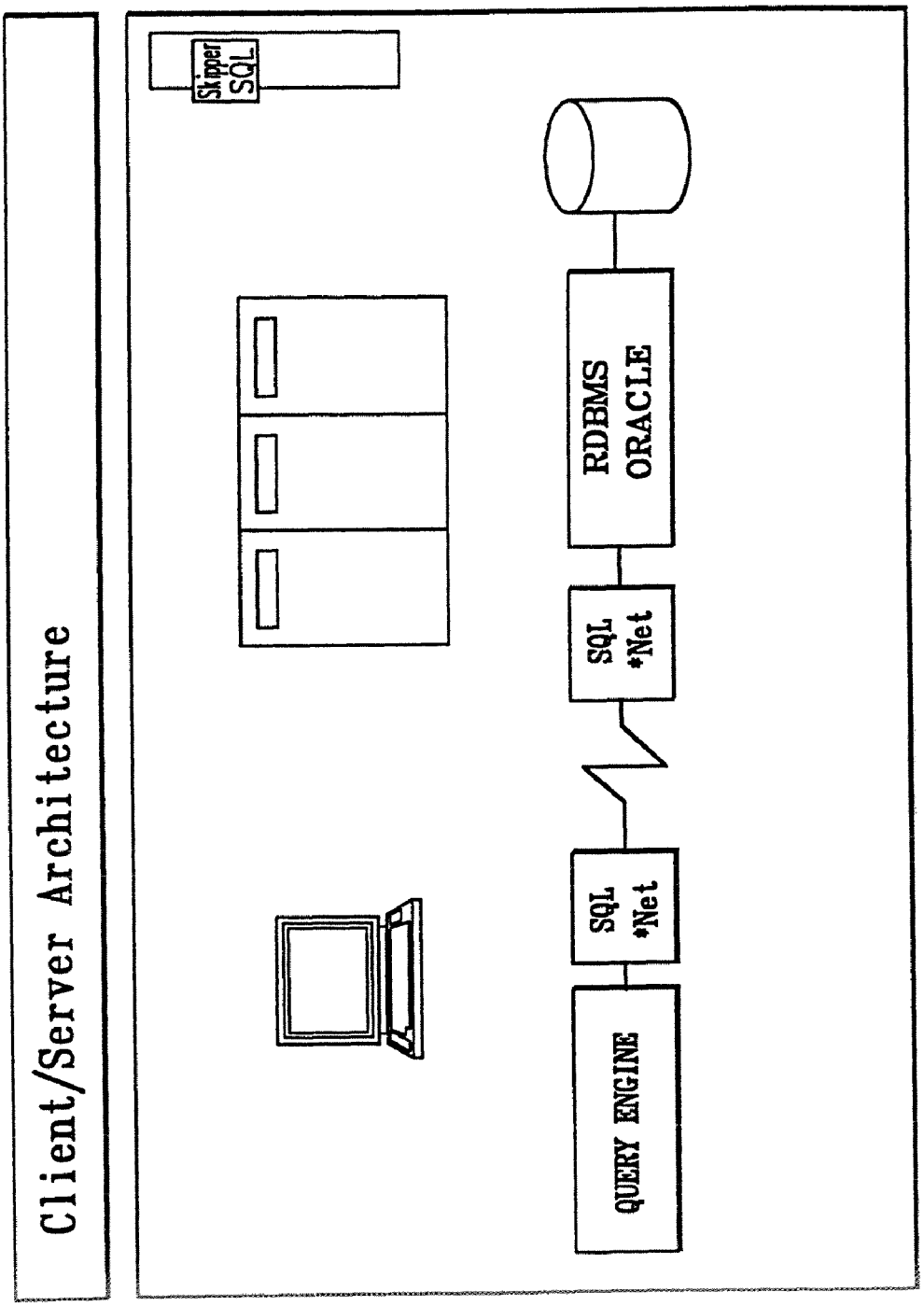

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives modifications and equivalents, which may be included within the spirit and scope of the invention as defined by the appended claims.

In one preferred embodiment, the present invention is a software implementation using client/server architecture for providing improved access to a relational database. The present invention can be utilized in a PC (personal computer) environment, such as is manufactured by International Business Machines Corporation, Apple Corporation, and the like. In addition, all interaction is possible using a "mouse" or the equivalent, and it is to be understood that the following detailed description of the various uses of the improved database accessing capability of the present invention could be utilizing such a PC-type configuration.

A User Object Based Representation of Data

Instead of presenting a user with data organized in a computer-oriented way (columns, rows, tables, joins), the user sees information through terms that he is familiar with in his daily business. These terms, or elements of information, which compose the vocabulary of the end-user, are called "business objects".

A set of objects composing a representation of data for a group of users sharing the same vocabulary is called a "universe". This set of Objects has no particular hierarchy nor structure, and there is no inheritance among such Objects.

This data representation frees the user from the requirement of knowledge and the understanding of the relational structure.

The Query Technique

This query technique is called the Query on Business Objects. This technique frees the users from knowing the syntax of any particular language. The meaning of a specific query is specified through a linear association of objects.

The present invention features an automatic generation of SQL statements.

In one preferred embodiment, the present invention includes software code (called the Query Engine) which generates SQL statements to query the relational database kernel of interest. This engine is able to generate not only the SELECT and the WHERE clause of the SQL sentence but also the FROM, the HAVING, the ORDER BY and the GROUP BY clause. Another feature of the Query Engine is its ability to generate the list of joins involved in the query. In order to do so, the present invention introduces the notion of contexts.

The Query Engine provides an automatic handling of group functions and relations which are the semantic components of SQL queries.

Detailed Description of Specific Embodiments

According to the present invention, several aspects are introduced to the field of relational databases. An understanding of these terms will be helpful in the appreciation of this invention.

Business Objects Universes.

The present invention implements a semantically dynamic tabular representation of data.

Universe

A Universe is an easy-to-understand partial or total representation of the database, designed for a particular application or group of users.

Although data is stored in a single database, different users may have different views on this data. Users manipulate a vocabulary specific to their group of users.

The vocabularies of the different groups of users can differ in several ways:

words can differ.

the same word can refer to different types of information. For example, for a sales manager, the word "Customer" is used to designate the name and phone number of a person, but for a financial officer, the word "customer" may designate a company name and its bank reference.

the same words can refer to the same type of information, but in different populations of data. Thus the "customers" of a New York Sales Manager are customers in New York, while the "customers" of a French Sales Manager will be customers living in Frances Each group of users has a specific vocabulary and hence a specific universe. Thus, universes are independent of one another, and the users of one universe do not need to know of the existence of universes created for other users.

The Query Engine features data access control at the Universe level. A particular user can only access authorized Universes.

The creation and grant administration of Universes is carried out by a person termed the Manager. The Manager uses the Query Engine Manager Module, a superset of the Query Engine User Module.

A Universe consists principally of:

Classes. Logical sets of Objects. (visible to users)

Business Objects. Words that can be used in the Universe. (visible to users)

Joins. Relational synchronization between tables (not visible to users).

Contexts. Subsets of the list of joins (not visible to users).

The Manager Module provides a user-friendly interface to define these components.

Objects

A Business Object is a basic term of the users vocabulary.

An object is a tabular data representation.

An object is made of a single column:

a header: the header is the name of the object several rows of data the Object ITEMS makes reference to an illustrative list of items sold by the company, as illustrated in Chart A.

CHART A

| ITEMS |
|---|
| FERRARI |
| MASERATI |
| PEUGEOT |
| CHEVEROLET |
| FORD |

This Object is equivalent to an attribute in the relation database.

Its Query Engine definition is:

Name: ITEMS

Select: items.item_name

Where:

The Object EXPENSIVE ITEMS makes reference to a list of expensive items sold by the company, as shown in Chart B.

CHART B

| EXPENSIVE ITEMS |
|---|
| FERRARI |
| MASERATI |

This object is equivalent to an attribute in the relation database with some restrictions.

Its Query Engine definition is:

Name: EXPENSIVE ITEMS

Select: items.item_name

Where: items.price >100000

The Object CUSTOMER makes reference to the list of known customers, as shown in Chart C.

CHART C

| CUSTOMER | |
|---|---|
| Bernie Left | 434-44-33 |
| Denis Right | 455-65-55 |
| Chris Lab | 453-34-34 |
| Phil Boy | 343-34-44 |
| Alex Dawn | 233-33-22 |

This Object in Chart C is the concatenation of three attributes in the relational database: First Name, Name and Telephone Number.

Its Query Engine definition is:

Name: CUSTOMERS

Select: customers.cust_firstname, cust.cust_lastname, cust.phone

Where:

The Object QUANTITY SOLD is information that is meaningful to any employee of the company, as shown in Chart D.

CHART D

| QUANTITY SOLD |
|---|
| 2342 |

This Object in Chart D is a calculation made on one attribute. In this particular example, this is the sum of the quantity sold for all products.

The Object SALES REVENUE is a typical sales executive term. This is information that allows him to measure his work, as shown in Chart E, below.

CHART E

| SALES REVENUE |
|---|
| 234,242,675.99 |

This Object in Chart E is a calculation made on several attributes accessible in the relational database. These attributes are present in several tables (relation).

Its Query Engine definition is:

Name: SALES REVENUE

Select: sum(items.price*order_items.qty)

Where:

As will be seen later in the section "Query on Business Objects", these objects do not have fixed data attached to them. The data, i.e., the content of the rows of the column can change according to the query in which the object is used: the meaning of the object (its "semantics") is dynamic.

Classes

Classes are logical groups of Objects. They are a way for end-users to find an object in a universe more easily.

The class ORDERS can include of all the objects related to an order, as shown in Chart F.

CHART F

| ORDERS |
|---|
| DATE OF ORDER |
| AMOUNT |
| ITEMS |
| ITEM NET PRICE |

Joins

A join is an equation that links two tables. In the relational database theory, it usually corresponds to the primary key of a table and the foreign key of another.

In SQL language, to retrieve data coming from two tables, a user has to explicitly define the join existing between the two tables.

- the table CUSTOMERS includes columns like cust_names, cust_address, and also a country identifier cust_country_id.
- the table COUNTRIES includes the columns country_id and country_name.

To create a query asking for the name of the customers and the countries, the user of SQL will have to specify the following join:

customers.cust_country_id=countries.country_id.

In the Query Engine, instead of letting the end-user define the joins for each query, which is a complex and non-natural task, the Manager defines the list of all the potential joins between the tables involved in a Universe.

It is then the task of the Query Engine to automatically determine the proper joins to use in a query (see section below on Query on Business Objects).

The list of Joins is an important part of the Universe definition.

Contexts

A context is a part of the list of joins. The use of a particular context for a query gives a specific meaning to this query and therefore to the objects that compose that query.

The definition of context is necessary when the list of joins includes loops, therefore includes multiple paths to go from one table to another. A context usually does not include multiple paths.

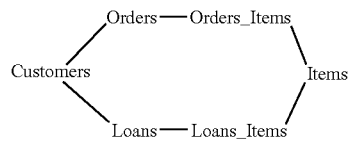

For that particular database, the list of joins includes two paths from customers and items.

The Manager defines two contexts:
The context of Orders:

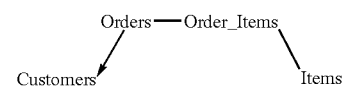

and the context of Loans:

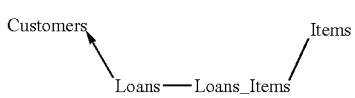

The choice of a context, either manually by the user or automatically by the Query Engine will cancel the ambiguity and give a meaning to the query.

The section Query on Business Objects describes how a context is chosen.

The Query On Business Objects

The three components of a query.

In the Query Engine, an end-user only has to define three elements:
- the objects to retrieve.
- the conditions that the results must match.
- the order in which the results must be sorted.

All these elements are defined with the use of Objects.

Associating Objects Together

Every Business Object has a general meaning and can be used "as it is" to compose a query as far as it can be considered as a column header.

The association of two Business Objects will produce an answer made of two columns which contents depend on the association.

For example, the association of the CUSTOMER Objects and the QUANTITY SOLD returns a two column result where can be read the quantity sold by customer, as shown in Chart G.

CHART G

| CUSTOMER | | QUANTITY SOLD |
|---|---|---|
| Bernie Left | 434-44-33 | 350 |
| Denis Right | 455-65-55 | 560 |
| Chris Lab | 453-34-34 | 660 |
| Phil Boy | 343-34-44 | 560 |
| Alex Dawn | 233-33-22 | 213 |

Now one can use the same Objects QUANTITY SOLD associated with the Objects ITEM, and its meaning will be different, as shown in Chart H.

CHART H

| ITEM | QUANTITY SOLD |
|---|---|
| FERRARI | 10 |
| MASERATI | 200 |
| PEUGEOT | 5 |
| CHEVERLOT | 120 |
| FORD | 2008 |

Defining Conditions

The definition of condition is done in two steps:

First, the user defines the elementary conditions, then he defines the logic linking the different elementary conditions.

As elementary condition is composed of an object, an operator and operand as shown in Chart I:

CHART I

| Object | Operator | Operand |
|---|---|---|
| ITEM | Equals | FERRARI |

The operand can be a constants a variable, an object or even a query.

The Logic is the definition of a logical AND and OR as well as the definition of the parenthesis between these conditions. The Query Engine uses a visual representation of the logic which prevents the user from defining parenthesis. The end-user defines groups of conditions by indenting them.

As an Example:

IF ITEM Equals FERRARI AND CITY Equals PARIS OR ITEM Equals 2CV AND CITY Equals ROMA is translated in SQL by (item='FERRARI' and customer.city='PARIS') or (item='2CV' and customer.city='ROMA')

Defining Sorts

The definition of the sort is done by choosing an object and the sorting order, as shown in Chart J.

CHART J

| Object | Order |
|--------|-------|
| PRICE  | Desc  |

The Query Engine

Once the user has defined a Query using the Query on Business objects Interface, The Query Engine generates the SQL query and transmits it to the relational kernel. The translation of the Query on Business Objects definition to the SQL statement is carried out by an engine called the Query Engine, as previously described. The rule databases are the Query on Business Objects Query and the Universe (as a set of definitions), the deduction is the generated SQL. The Query Engine uses full-wired rule database.

The strategy used by the Query Engine is explained below. It is a functional description; the technical implementation of the strategy in commercial products can differ slightly, using algorithms that better suit the internal data structures of the particular product.

1. The SELECT Clause

The first step of the automatic SQL generation is the generation of the Select clause.

The QE (Query Engine) replaces the Business Objects select in the Result Objects window by their SQL equivalent.

Each Business Object has an SQL equivalence, which can be any SQL Select clause compatible string. The concatenation of these strings, separated by commas, is thus a Select compatible string.

2. The Initial List of Tables

At the first step, the QE has already deducted a list of tables involved in the query. They directly come from the definition of the Objects selected in the Result Objects window. The QE analyzes the definition of the Objects used in the Conditions window, as well as those in the Sorts window in order to complement the List of Tables involved in the query. This list is called the Initial List of Tables.

3. The Final List of Tables

The objective of this step is to determine a single path connecting all the tables in the Initial List of Tables using the List of Joins of the current Universe. In searching for such a path, the QE may require the inclusion of tables not yet part of the Initial List of Tables. The union of these new tables and the Initial List of Tables is called the Final List of Tables.

In order to find the path, the QE determines each path linking 2 tables from the Initial List of Tables by searching through the List of Joins. For each couple of tables, the operations returns 0, 1 or several paths.

If one operation returns 0, it implies that the query is invalid (it would generate a Cartesian product).

If all operations return 1 path, the Final List of Tables is the union of all the tables involved an the Joins of the different paths and the tables in the initial List of Tables.

If one operation returns several paths, it implies that a choice must be made. This is done through the use of Contexts. The QE first checks for the existence of Contexts. If none are defined for the current Universe, the Final List of Tables is the union of all the tables involved in the joins of the different paths.

If some contexts have been defined, the QE will select only the Contexts that are applicable to the current query. A context is applicable to a given query if its list of joins involve at least all the tables of the Initial List of Tables.

If only one context is applicable to the current query, the QE uses the Context's list of joins to deduct the Final List of Tables. If several Contexts are applicable, the QE proposes the different contexts to the user. The user chooses the Context he wants and the QE deducts the Final List of Tables from the use of this Context.

As an Example:

In the example given above in the section "Contexts", if the end-user associates the objects in Chart K, below:

CHART K

| CUSTOMER | ITEMS |
|----------|-------| the Query Engine cannot choose between the Loan context or the Order context The user will be asked to choose "Loans or order"

If the user chooses Orders, then the query will mean "the items ordered by customer".

If the user chooses Loans, the query will mean "the items loaned by customer".

4. The From Clause

The QE builds the From Clause by listing all the tables of the Final List of Tables.

5. The Where Clause a) The Generation of Joins

The first part of the where clause is the list of joins. They are all the joins from the selected Context (or the global list of joins if no Context was used) that involve the tables of the Final List of Tables. All these joins are linked with an AND.

b) The Conditions On Objects

The QE builds the conditions included in the definition of the objects mentioned in the Result Objects window.

c) The Simple Conditions.

The QE builds the conditions placed under the Objects in the Results Objects window by converting it in its SQL equivalent. This operation is not done if the Object has a group function in its SQL definition.

(d) The Translation of the Conditions Window

The QE translates the Objects and the operators used in the condition window by their SQL equivalents If an object used in this Window has a condition in its SQL definition, this condition is added.

6. The Group By Clause

The Second step is the generation of the Group By clause.

The Query Engine builds a list of non-group function Objects by scanning the list of Objects involved in the Query (in the results or in the sort). Non-group function Objects are Objects with a SQL equivalent that does not make use of any relational group function (such as sum, count, and so on).

Once this list has been built, the "Group by" clause is generated using the concatenation of all of the SQL equivalents of the non-group function Objects present in the RESULT OBJECTS and SORTS Windows of the query definition.

In this particular example Sales Revenue is a Object containing a group function in its embedded SQL definition, Customer is not, thus the SQL equivalent of the Customer SQL Object is inserted in the Group by clause.

7. The Having Clause

The QE generates the Having clause by translating the simple conditions placed on Objects in the Result Objects window into their SQL equivalent.

8. The Order By Clause

The QE builds the Order by Clause by taking the sorts defined in the Sorts window and replacing them by their SQL equivalent Generation of Joins One important part of the query generation is the construction of the path used to access data. This is important in order to assure reliable and correct results.

The Query Engine uses the list of joins to connect the tables involved in the query. This may require the opening of tables not explicitly mentioned in the Object definitions. For example, in the query above, the Orders table must be included for the query to run correctly.

The Query Engine then tests the set of joins for multiple paths. If several paths are found to link two tables involved in the query, it means a choice must be made. The Query Engine will try to make that choice automatically. If contexts have been previously defined by the Manager, each of them will be compared with the list of tables involved in the query. Usually there will only be one appropriate choice of Context (i.e. compatible with the list of tables), and it will thus be automatically chosen by the Query Engine.

As an Example:

In the example given above in the chapter "Contexts", if the end-user associates the objects set forth in Chart L:

CHART L

| CUSTOMER | ORDER DATE | ITEM |
|---|---|---| the Query Engine will automatically eliminate the loan context since there is no path in that context to link the 3 tables involved in the above query (customers, orders, items).

If one of several contexts can be used, and the Where clause differs according to the Context chosen, the user is asked to choose between the various Contexts.

In each case a different SQL statement will be created.

If no context has been defined, the Query Engine will use all the available paths.

If no path can be found, the Query Engine warns the user that the generated query has no sense, and that the query implies unconnected relational data.

Translation of Conditions

Conditions can be of two different types:

Conditions on group functions

The SQL equivalence of these conditions is inserted into the Having clause of the Query.

Conditions on non group-function

The SQL equivalence of these condition is inserted in the Where clause of the Query.

To determine the SQL equivalence of a condition, the Query Engine simply replaces the Object, the operator, and the operand by their SQL correspondence.

To determine the parenthesis of the conditions, the Query Engine is based on the indentations defined by the end-user (as described in the section above, "Defining Conditions").

Translation of Ports

The translation of sorts is straightforward since it needs no intelligent mechanism from the Query Engine. It just replaces the object by its SQL equivalence and places that in an ORDER BY clause.

DETAILED DESCRIPTION OF THE QUERY INTERFACE

Now that a detailed description of the overall aspects of the present invention have been described, what follows below will be a detailed description of illustrative examples of operation of the Query Interface, according to the present invention.

The description in conjunction with FIGS. 1-28 assume that a user has access to a relational database system through a client/server architecture as shown in FIG. 1-A including suitable PC type environment, and that the user is also "clicking" on a particular feature through use of a suitable mouse type configuration or the equivalent.

In the specific example of FIG. 1, a user clicks on the "Create element of the Query. FIG. 1 illustrates a user clicking on the Create Query Option.

In FIG. 2, a user enters a Query Name, e.g., Q1.

Figure 3:
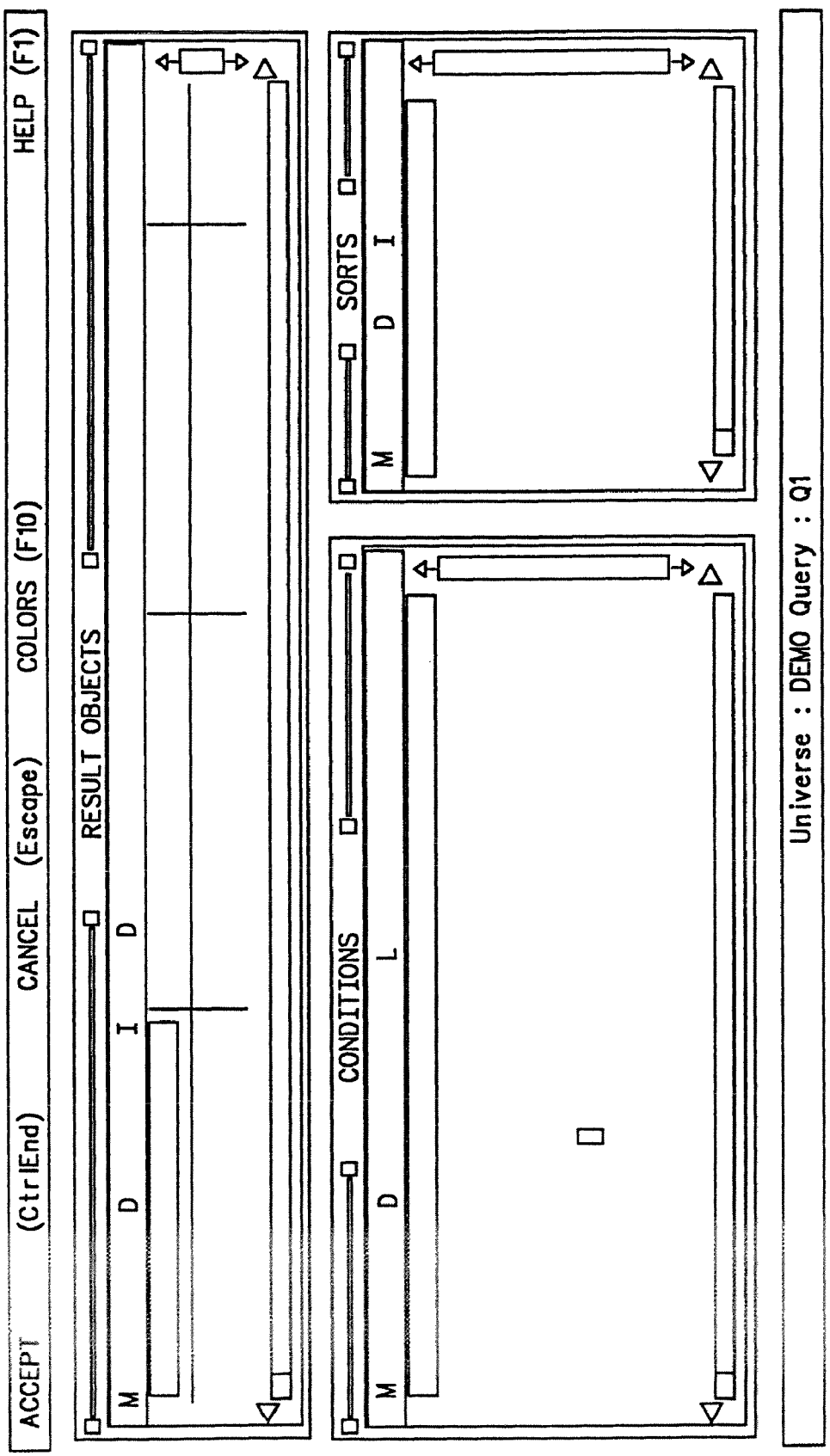
FIG. 3 depicts a technique used to construct queries which allows an end-user to define a question using point-and-click methods.

FIG. 3 illustrates the Query on Business Objects Definition Screen. This technique is used to construct queries which allows an end-user to define a question using point-and-click methods, without having to learn any language. A query can be divided into three different parts:

The result Objects: the information required by the user;

Conditions: the restrictions to be used on the data (these restrictions can be on any information contained in the database, not only the Objects of the result;

Sorts: the sorting of the returned data.

The Query On Business Objects Interface of FIG. 3 is a 'question frame' for users. It provides users with three empty windows, as shown in FIG. 3. Each window is used to specify a part of the query:

In the first window (RESULT OBJECTS), the user places Business Object in the empty cells, in order to construct an linear association of Business Objects. This gathering of the Business Objects gives a specific sense to each of the Objects used, and a sense to the query as a whole. It is important to note that the meaning of the line of selected Business Objects does not change if read from left to right or from right to left. This technology allows users to specify the semantics of every Business Object merely by associating the Objects together.

The second window (CONDITIONS) of FIG. 3 is used to specify a list of conditions on any of the available Objects. Each clause of the condition consists of an Object restricted by a operator The window provides graphical facilities to specify the logical operators and precedences between clauses.

Figure 4:
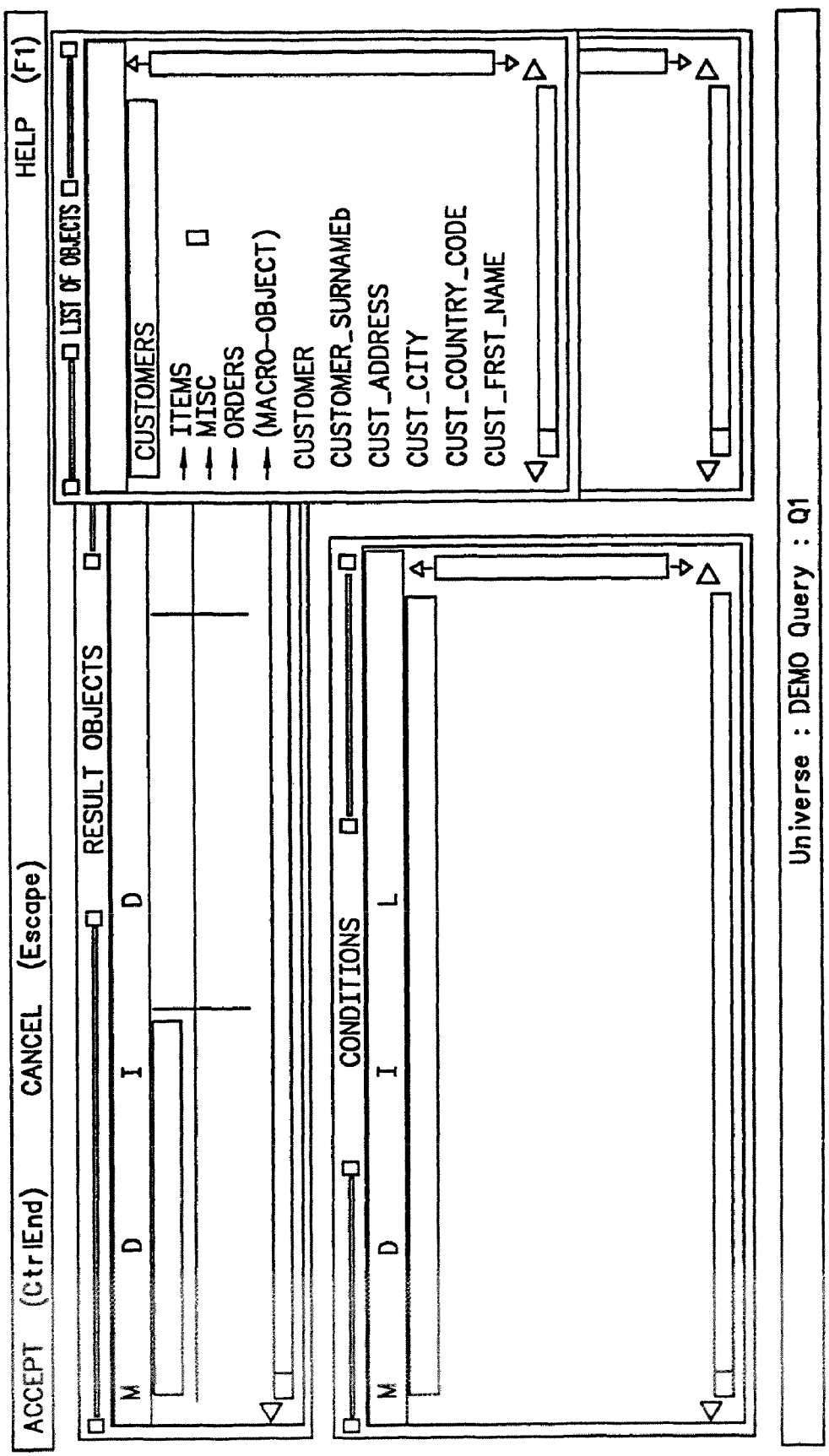
FIG. 4 depicts a Business Objects Selector window.

FIG. 4 illustrates the Business Objects Selector window. This window is activated when the user clicks on one of the empty cells of the Result Objects window. This list is contained in a resizable windows and contains a list of all the Business Objects of the current Universe.

The first section of this list is a list of Classes. Class names begin with an arrow. If the user clicks on a Class name, a second window opens containing the list of Objects contained in the class (recall that Classes are logically grouped sets of Objects)

The second section of the Selection window of FIG. 4 in an alphabetically sorted list of all the available Business Objects.

Each Object can have an associated help screen defined by the Manager. The user has access to these help screens for further information about each object.

This interface has two major advantages:

The list of Objects is automatically opened in order to propose the information entities (or "words") that are available. Thus, the end-users do not need to have prior knowledge of the information contained in the database. The various Business Objects available are presented to them.

A User can select a Business Objects in two different ways; either directly from the initial alphabetical list of the Objects, or by first choosing a Class, then selecting an Object within that Class.

Figure 5:
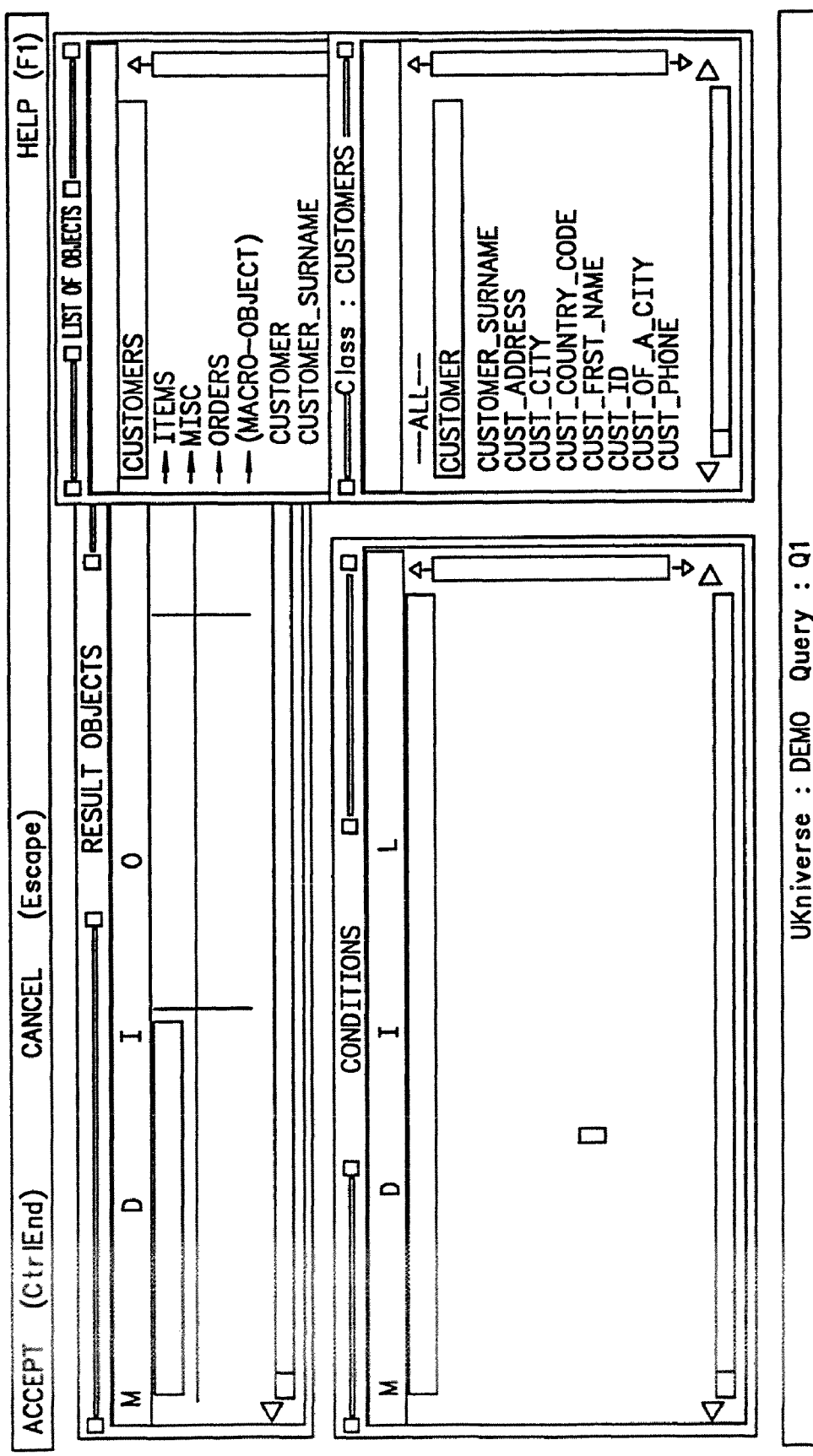
FIG. 5 depicts Customers class windows containing all the Objects related to a customer.

FIG. 5 displays the Customers class windows containing all the Objects related to a customer which are self-explanatory.

Figure 6:
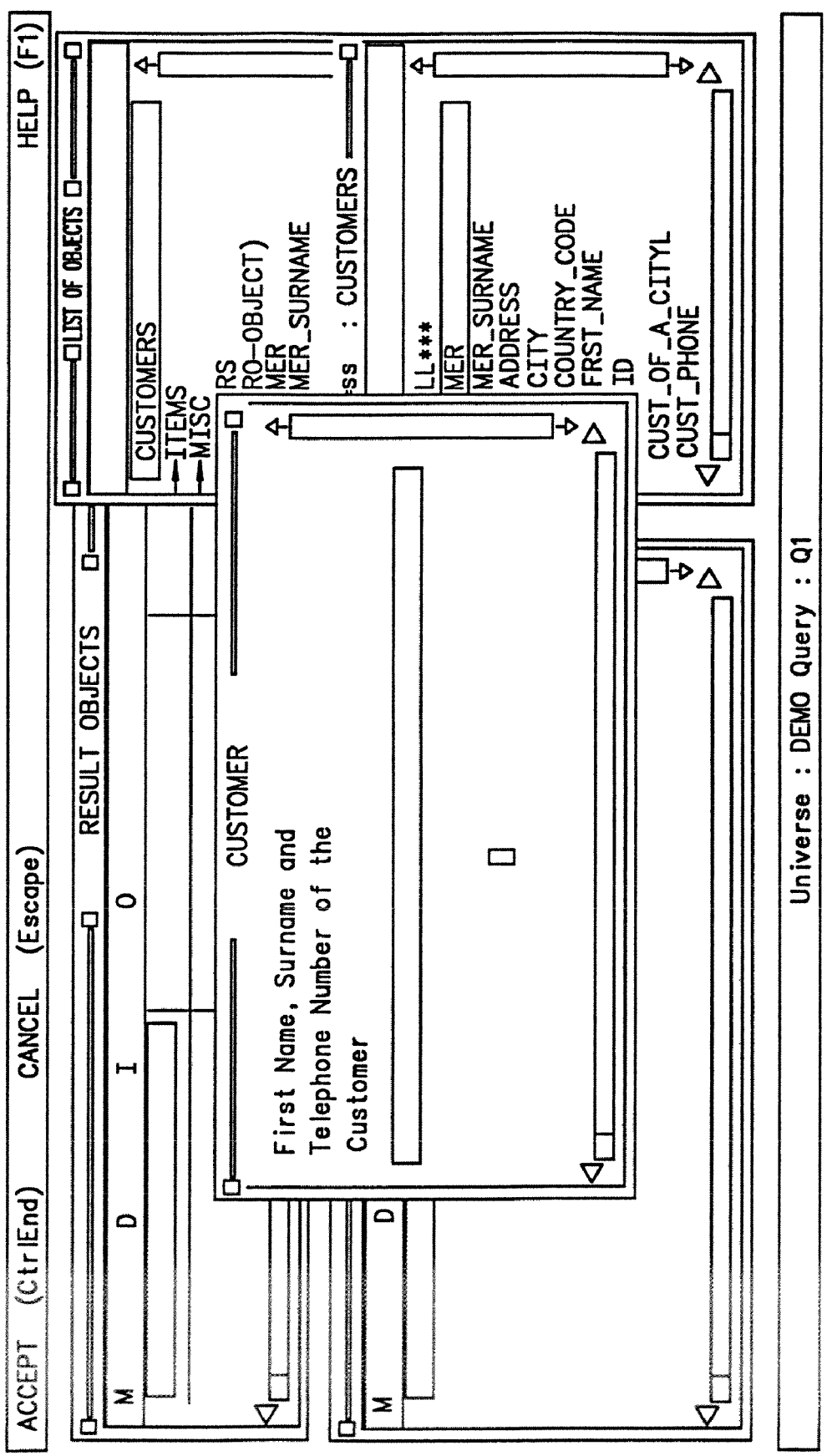
FIG. 6 depicts a specific help window.
Figure 7:
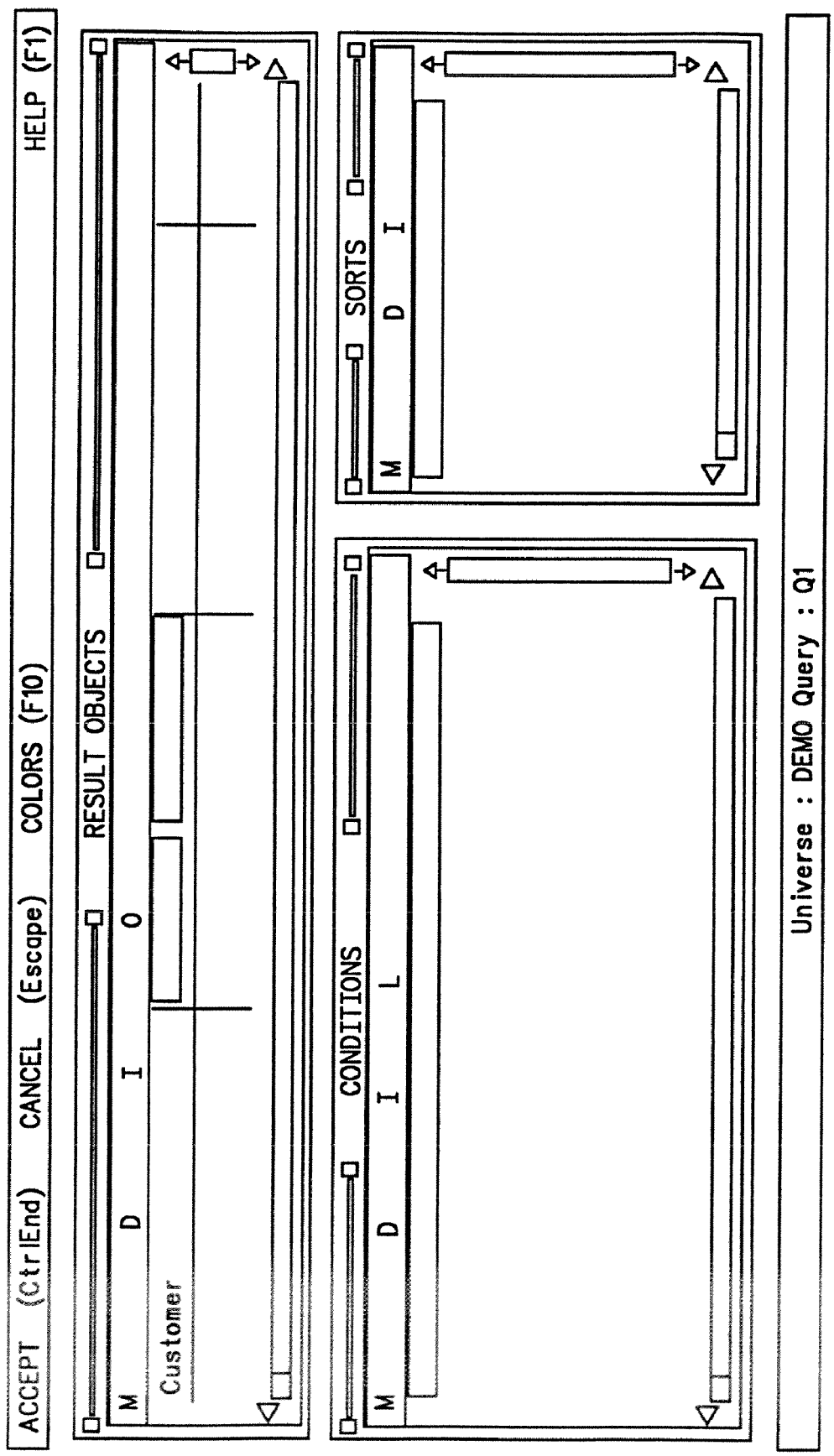
FIG. 7 depicts the first cell of the Result Objects window.

FIG. 6 illustrates a specific help window. On each Object users can access a specific help window In FIG. 7, the Customer Object which has been selected is now present the first cell of the Result Objects window.

Figure 8:
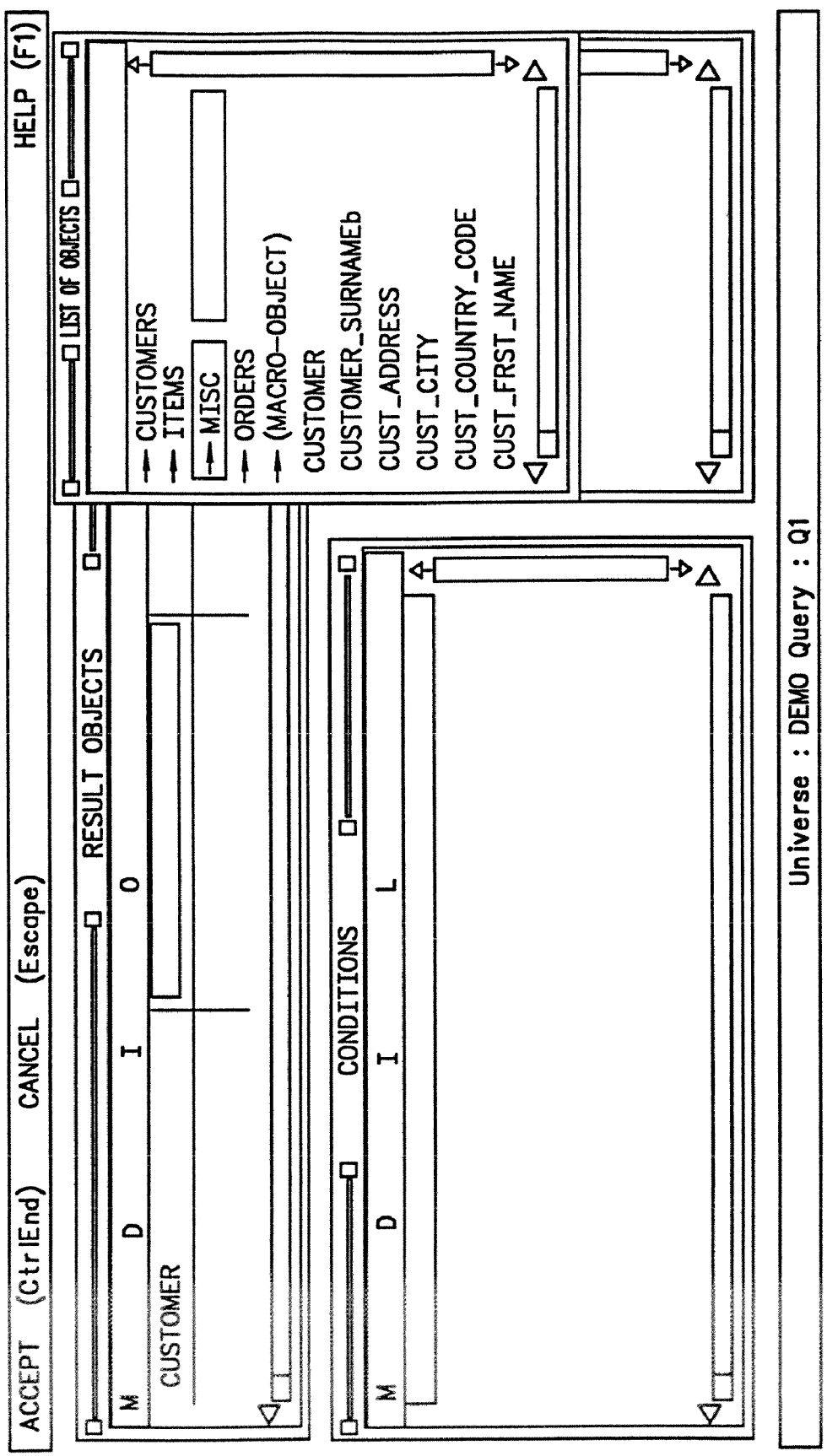
FIG. 8 depicts a List of Objects window.

In FIG. 8, clicking on the next blank cell opens the "List of Objects" window.

Figure 9:
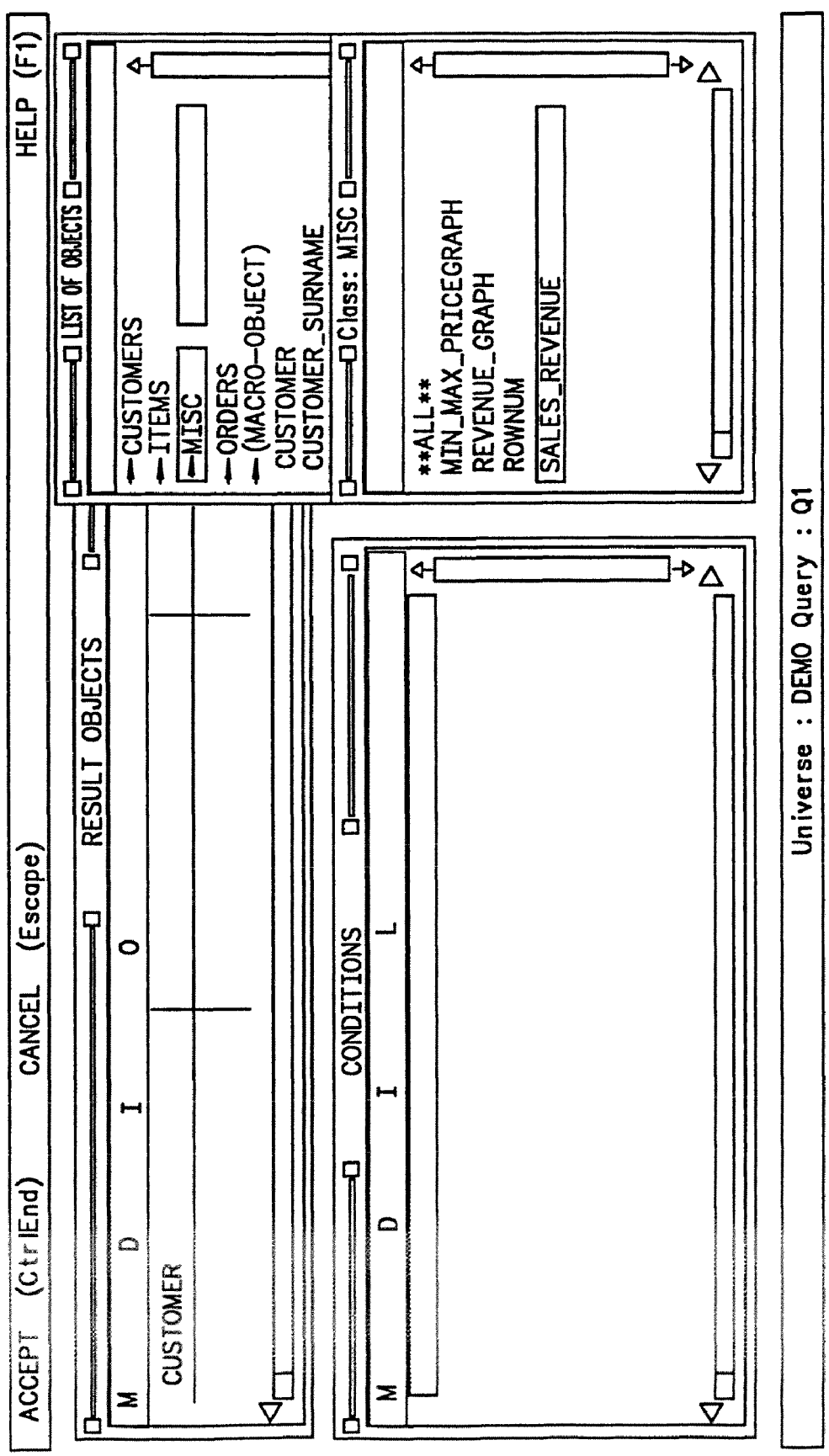
FIG. 9 depicts a Misc class window.

In FIG. 9, clicking on the Misc class opens the Misc class windows.

Figure 10:
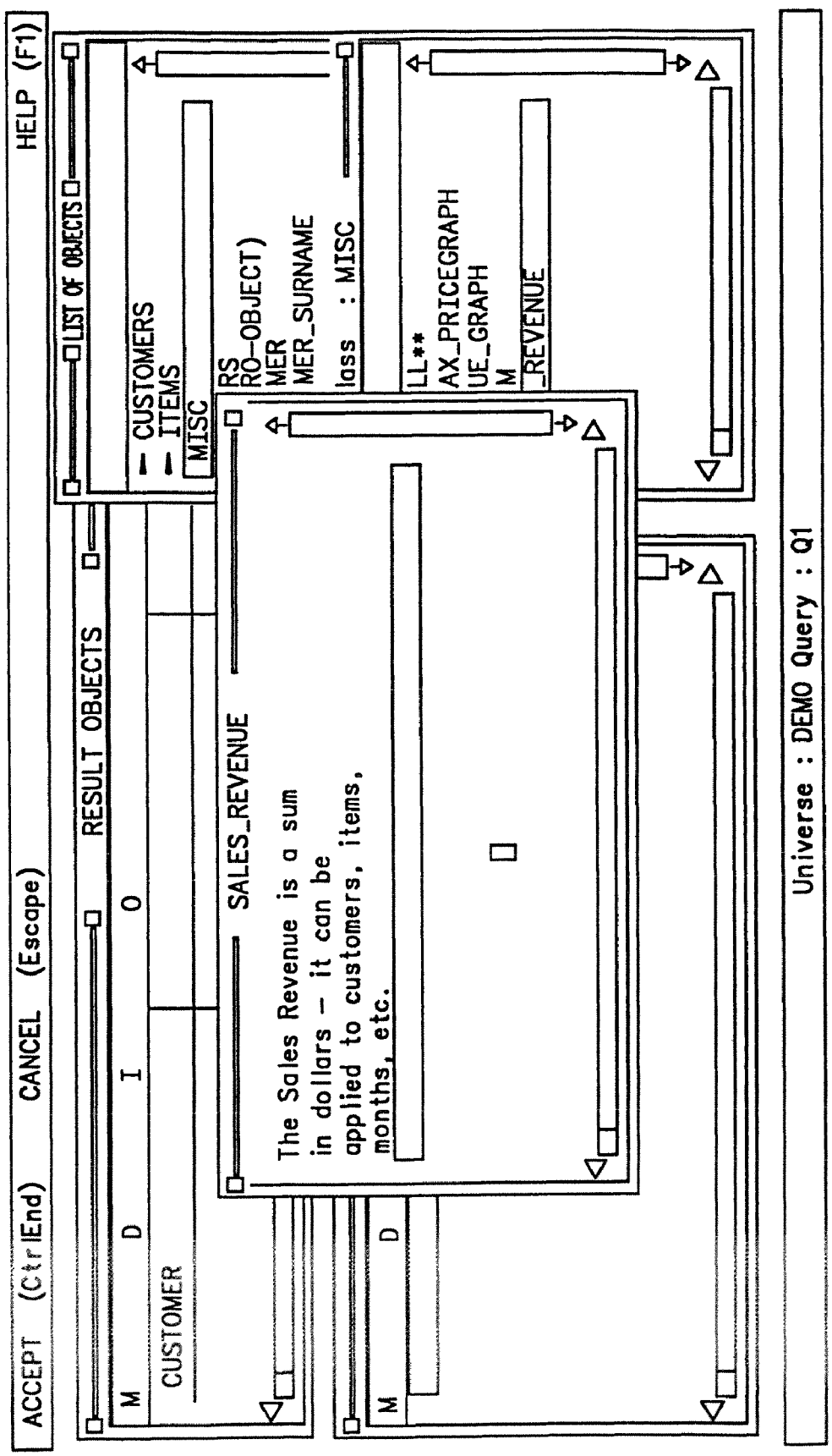
FIG. 10 depicts specific help about the Sales Revenue Object.

In FIG. 10, a specific help can be consulted about the Sales Revenue Object. For the example of FIG. 10, the Sales Revenue is a sum in dollars—it can be applied to customers, items, months, and so on.

Figure 11:
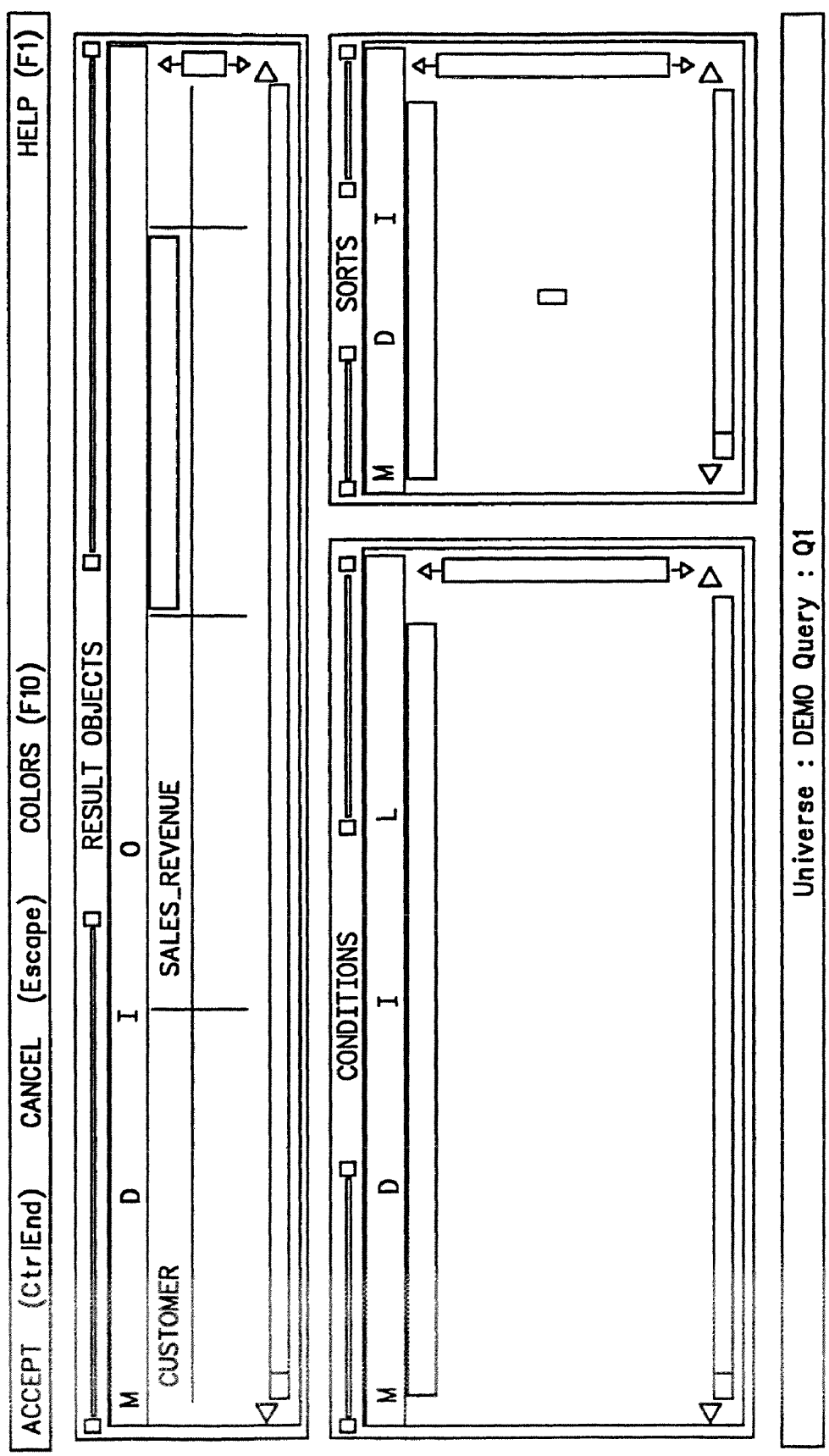
FIG. 11 depicts two selected Objects. Their linear association gives a meaning to each of them, the desired information is "the Sales revenue by customer".

In FIG. 11, two objects have been selected. Their linear association gives a meaning to each of them, the desired information is "the Sales revenue by customer".

Figure 12:
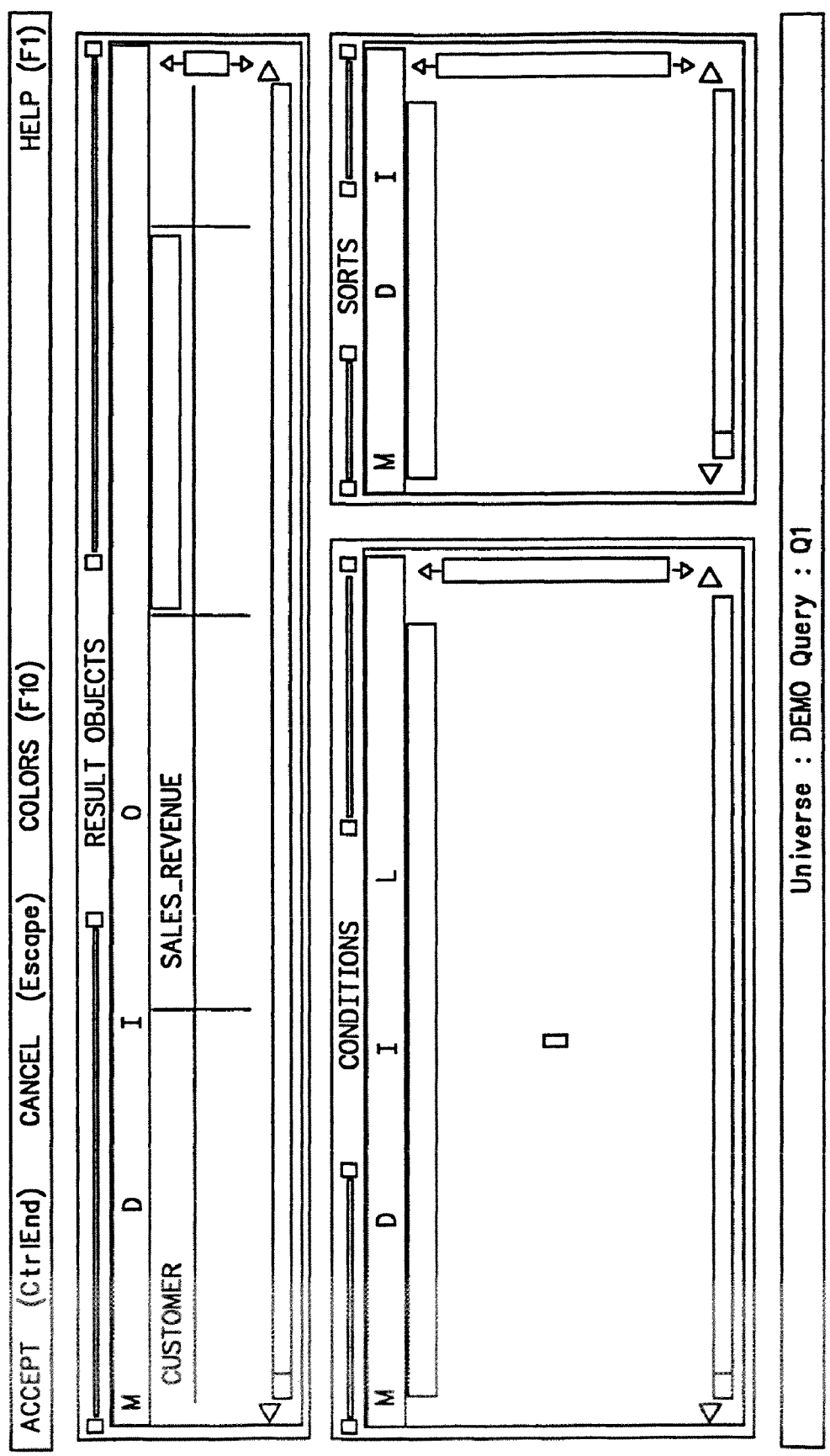
FIG. 12 depicts a Condition Window.

FIG. 12 shows that it is possible to add some conditions to this query by clicking on the Condition Window.

Figure 13:
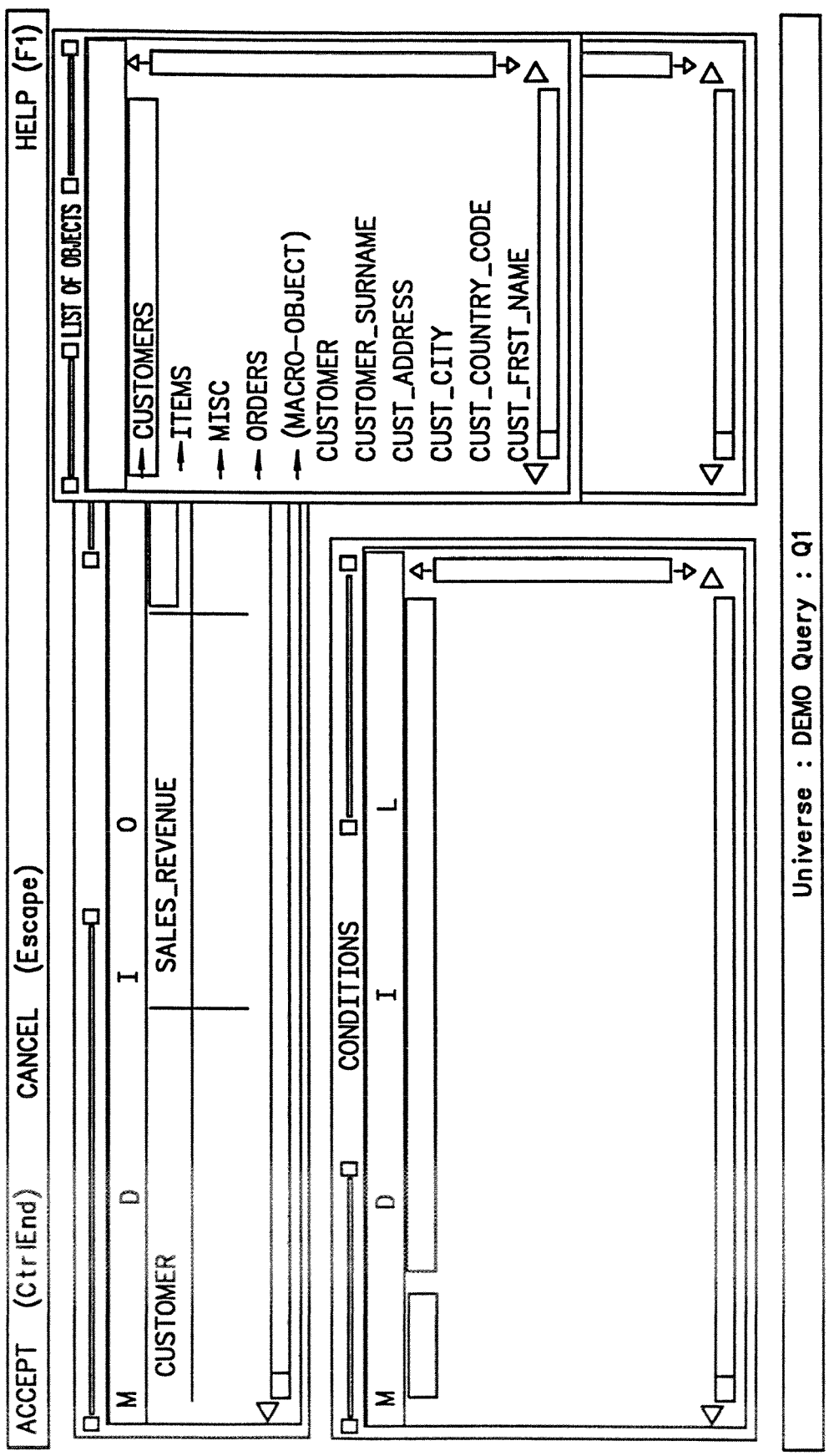
FIG. 13 depicts a List of Objects window.

FIG. 13 shows that clicking on a blank line in the "Conditions" window opens the "List of Objects" window.

Figure 14:
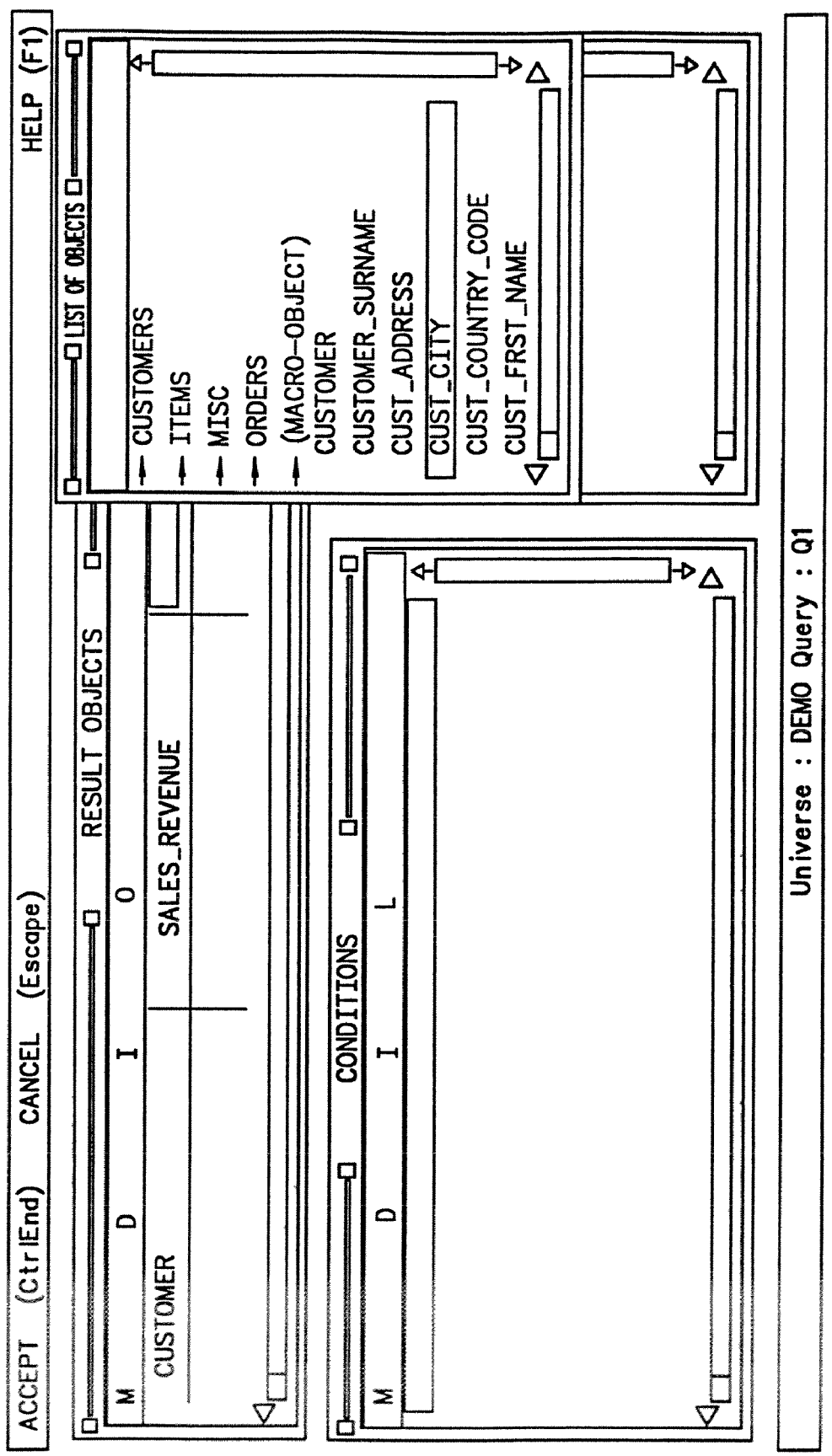
FIG. 14 depicts putting a Condition on an object.

FIG. 14 shows putting a condition on the City Object.

Figure 15:
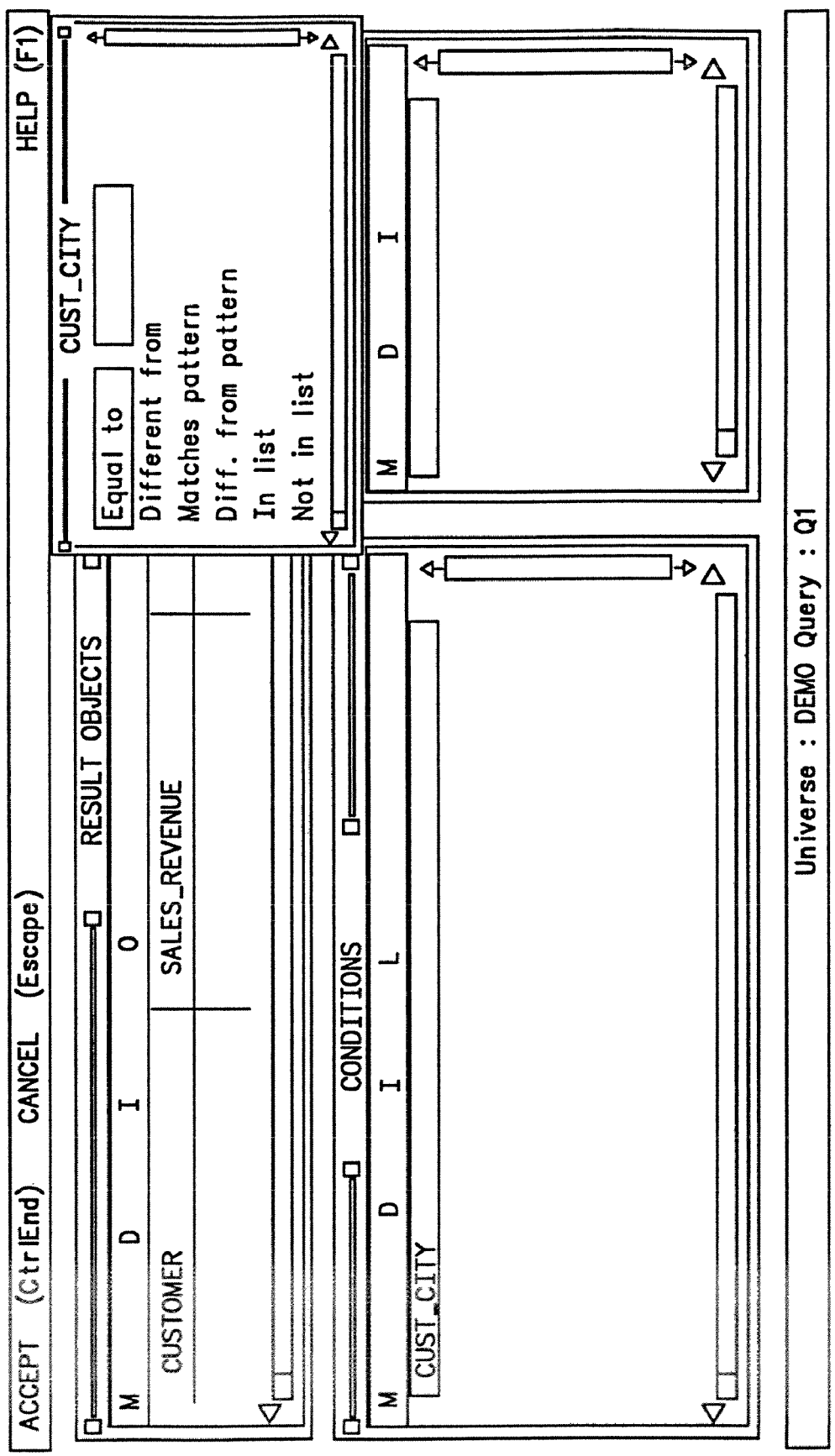
FIG. 15 depicts Query Engine provides all the logical operator used by SQL, in this particular example lets select the "Equal to" operator.

FIG. 15 shows the Query Engine providing all the logical operations used by SQL, in this particular example selects the "Equal to" operator.

Figure 16:
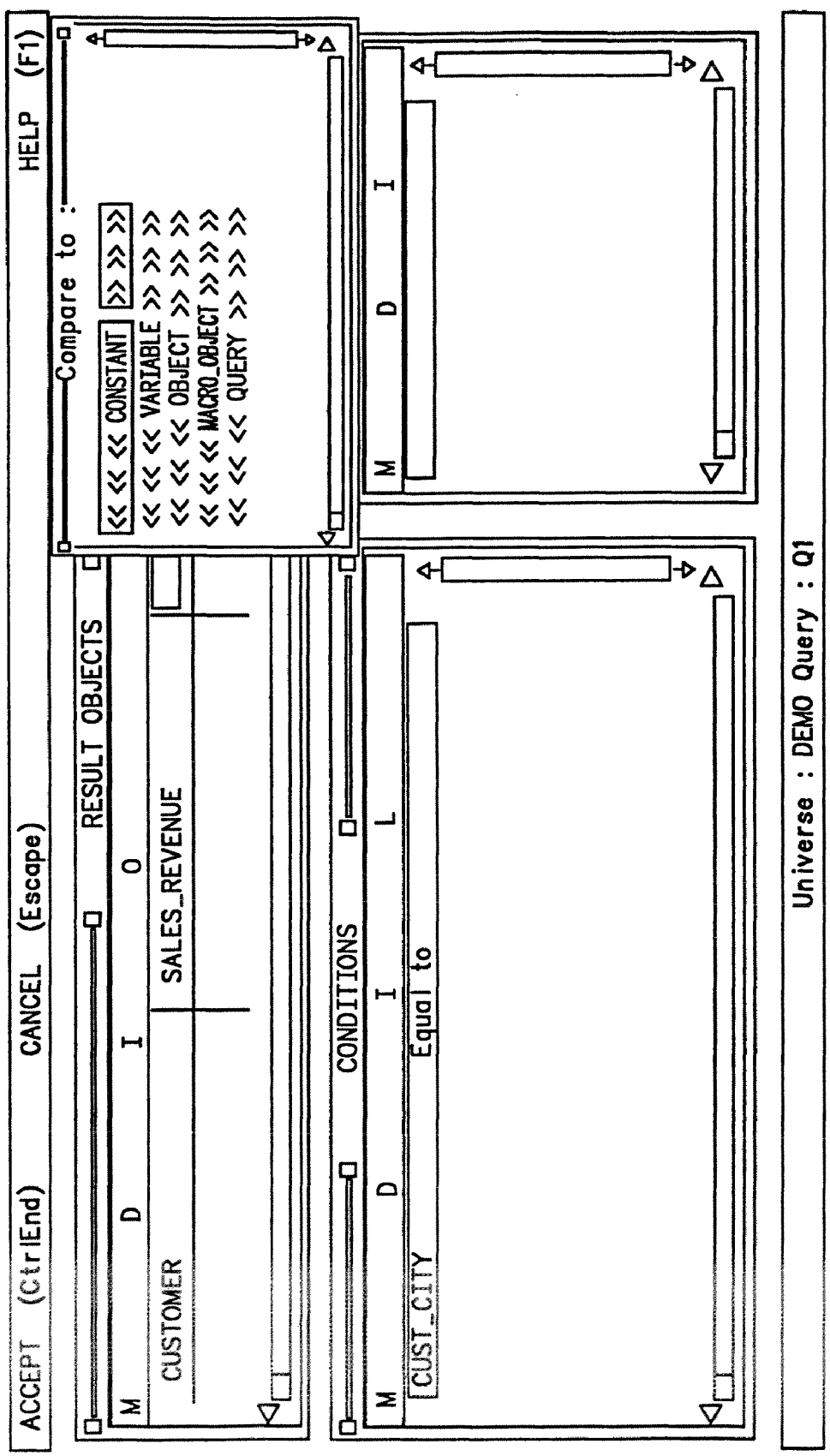
FIG. 16 depicts a comparison of objects "constant" type is here selected.

In FIG. 16 objects can be compared to several kind of operator The "constant" type is selected here.

Figure 17:
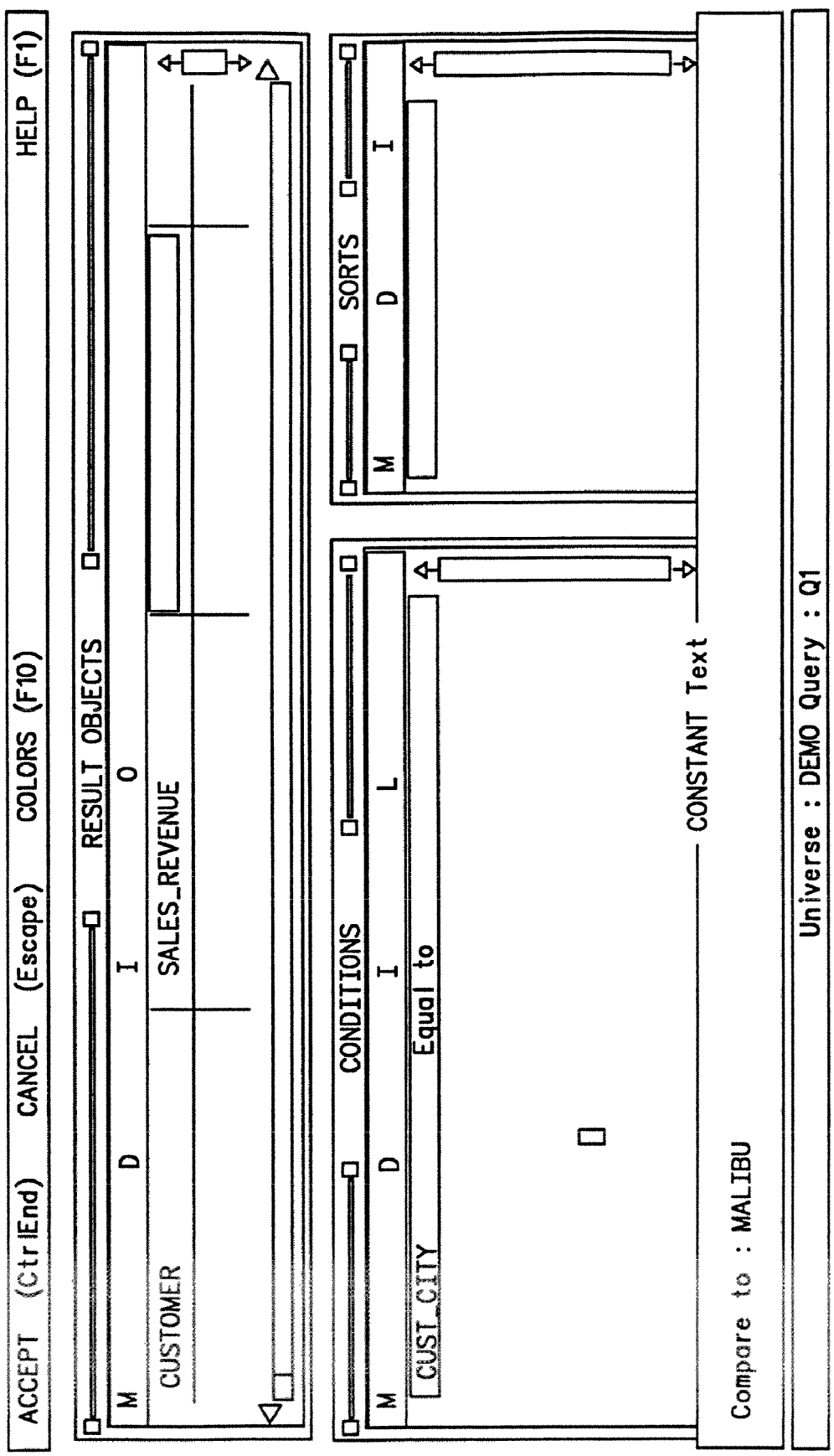
FIG. 17 depicts: The condition is "City" equals to "Malibu".

In FIG. 17, the condition is "City" equals to "Malibu".

Figure 18:
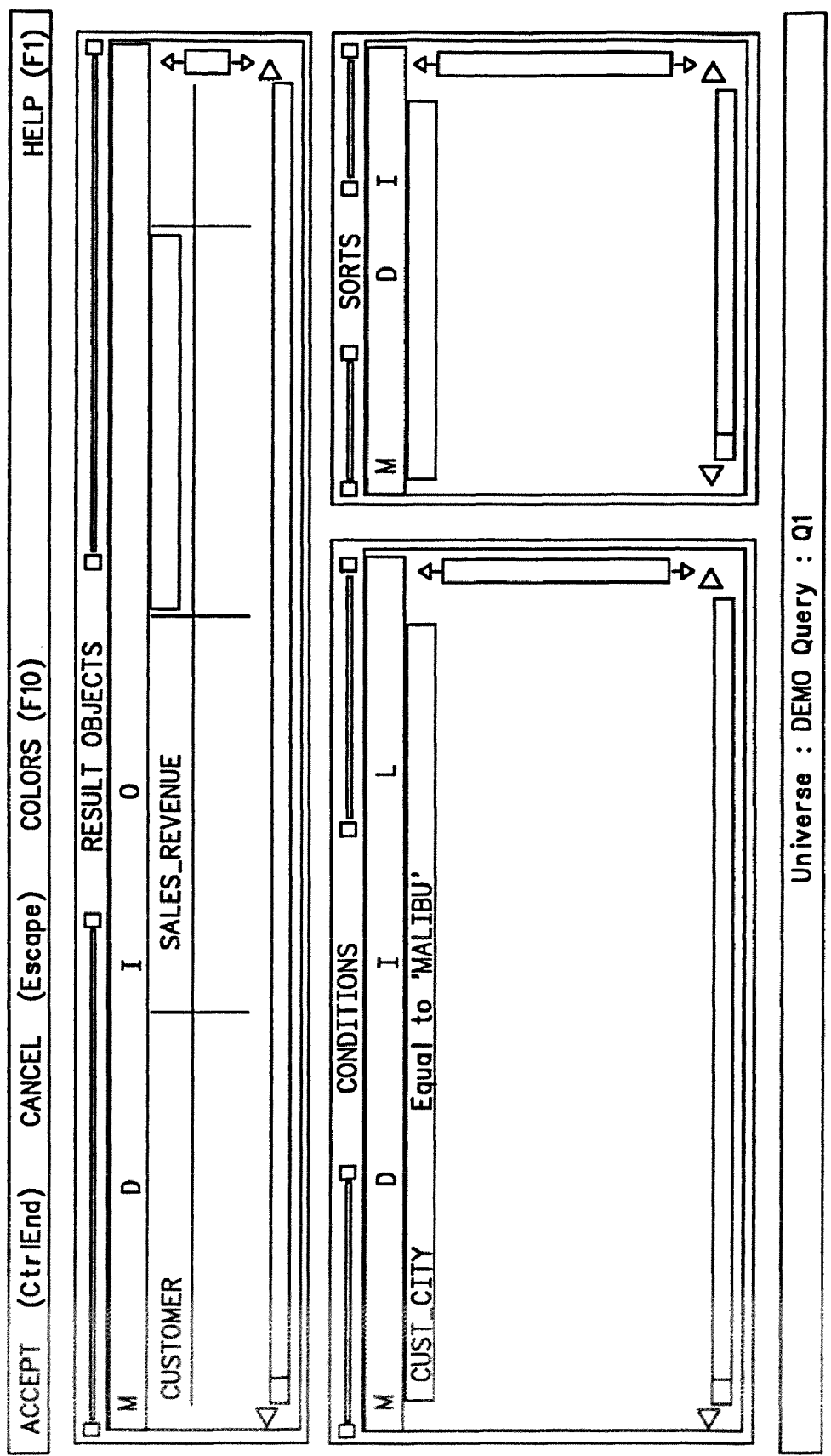
FIG. 18 depicts the Sorts window.

In FIG. 18, the cursor is moved to the Sorts window.

Figure 19:
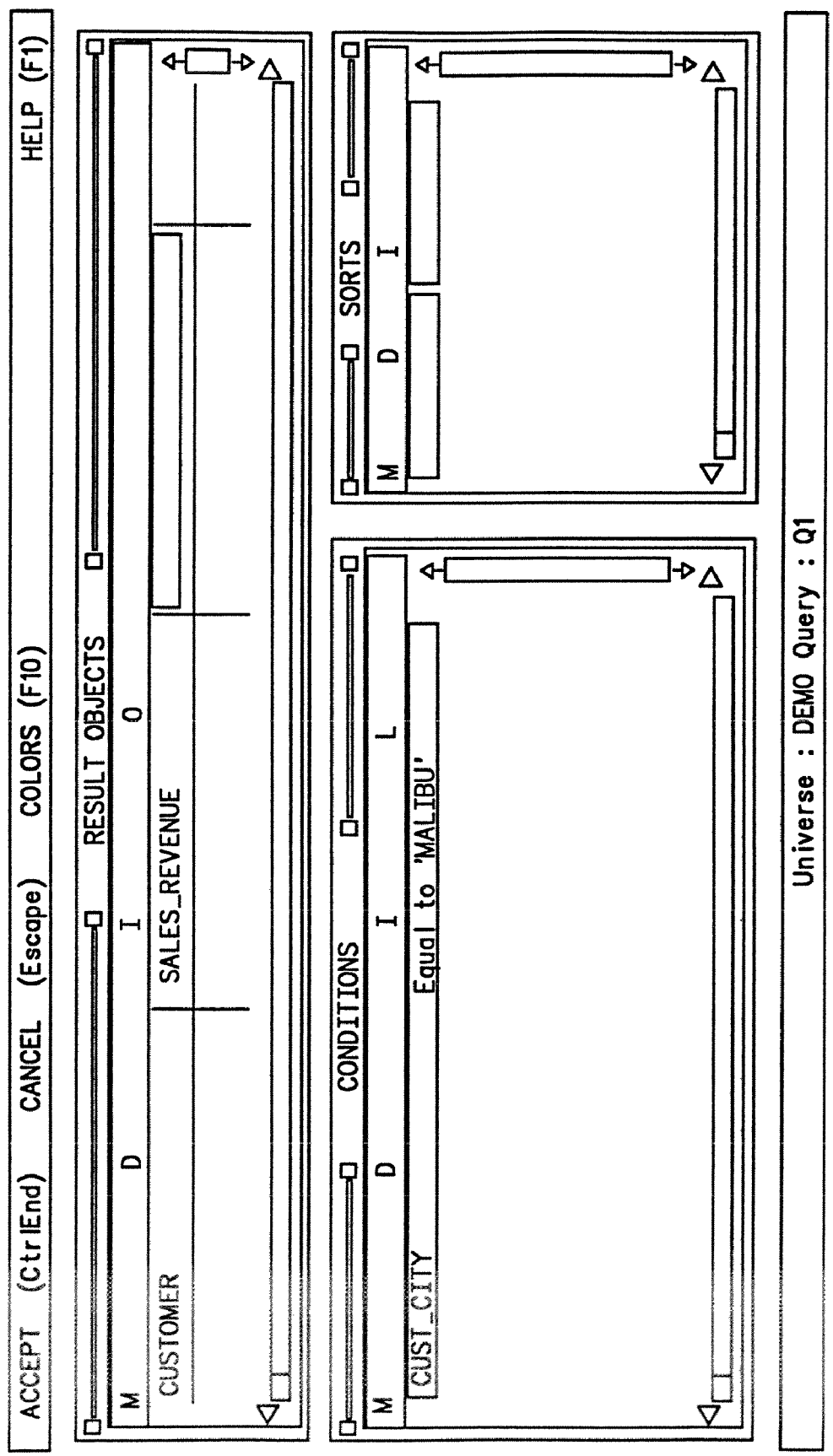
FIG. 19 depicts the activated Sorts window.

In FIG. 19, clicking on the "Sorts" window will active it.

Figure 20:
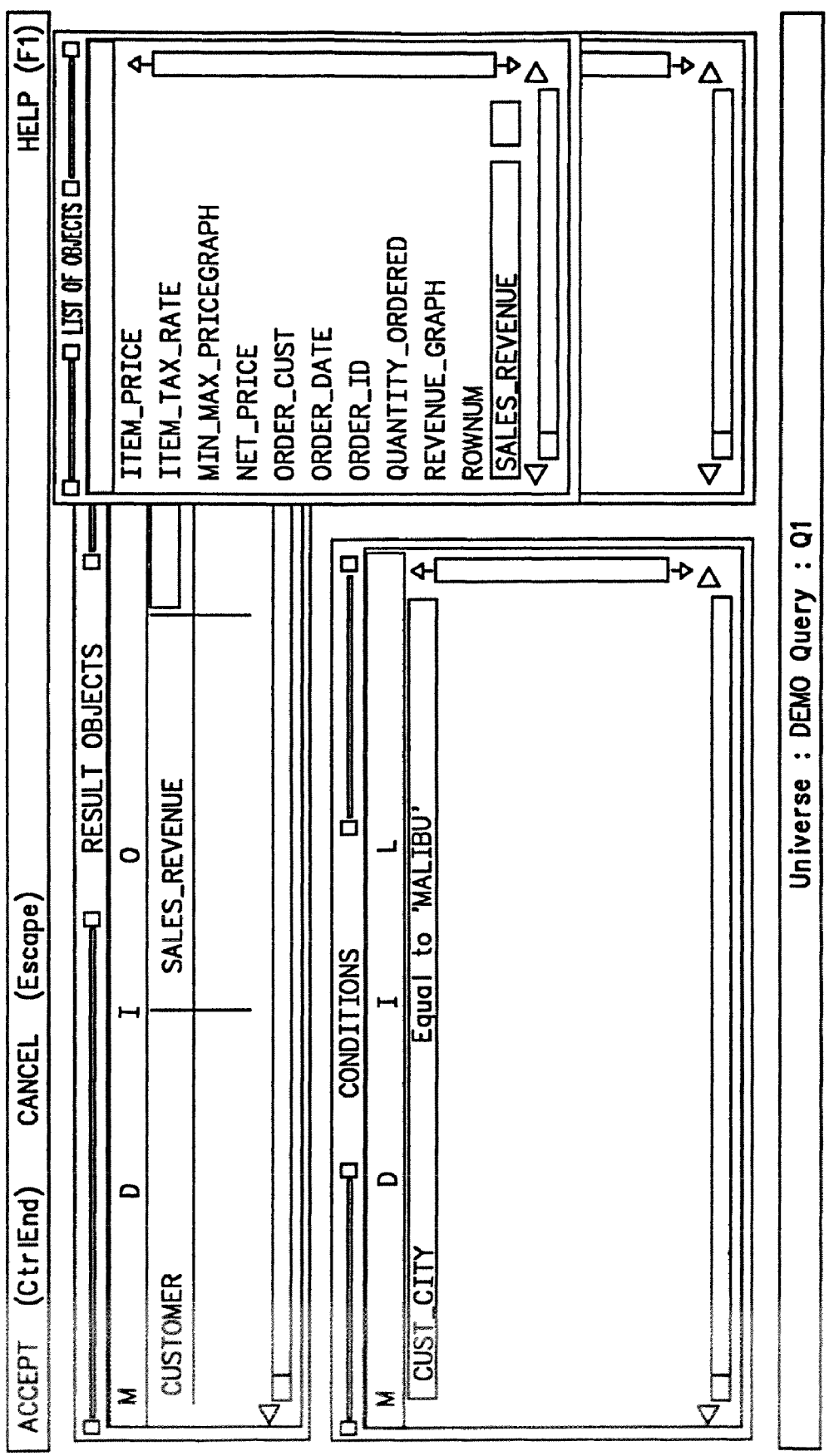
FIG. 20 depicts sorting an object.

In FIG. 20, as far as sorting can be done on Objects, clicking in an empty cell of the "Sorts" windows opens the "List of Objects" windows. For example the user can introduce a sort on the "Sales Revenue".

Figure 21:
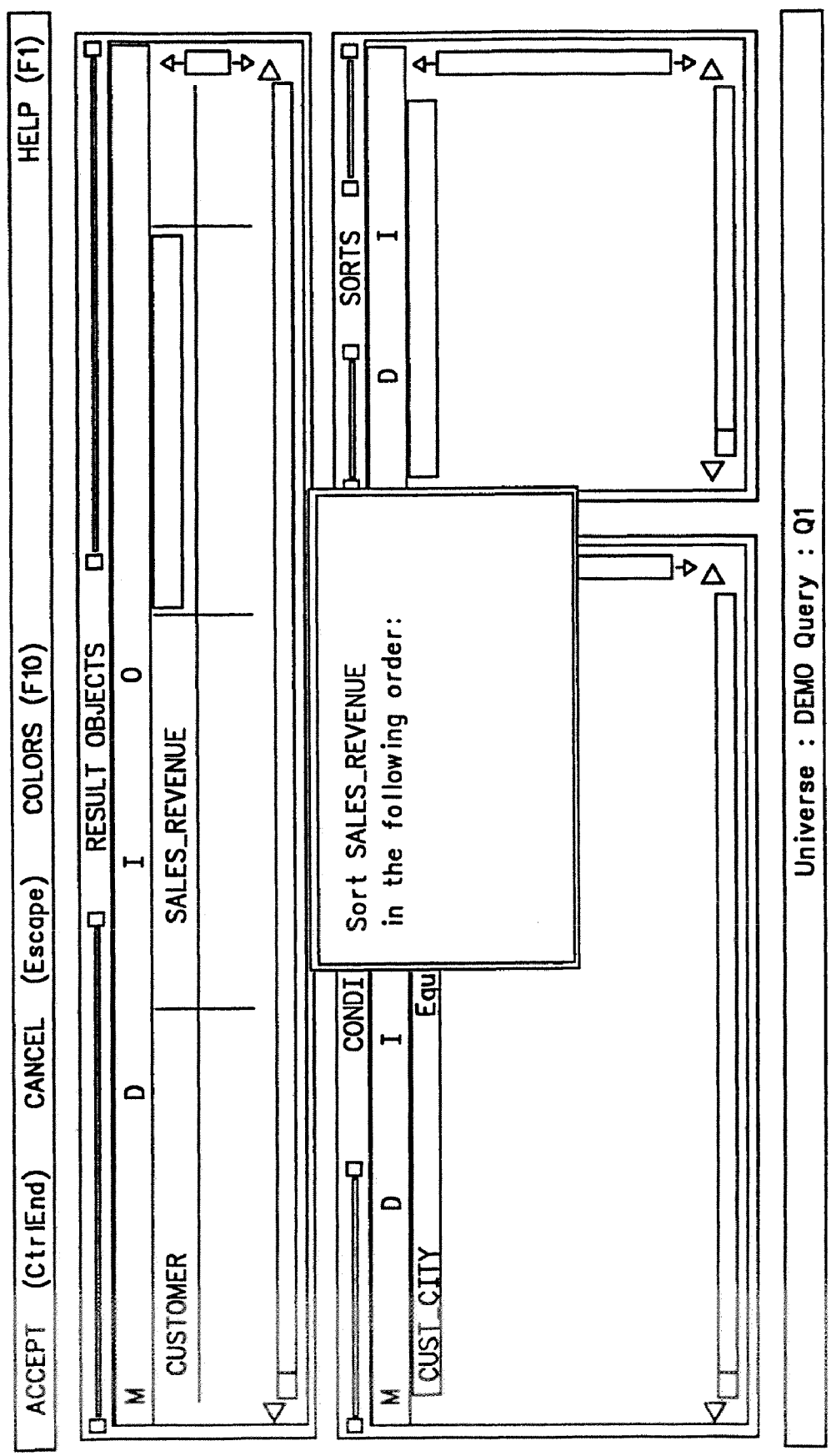
FIG. 21 depicts order of sort, i.e., ascending or descending order.

FIG. 21 shows that it is possible to sort in ascending or descending order.

Figure 22:
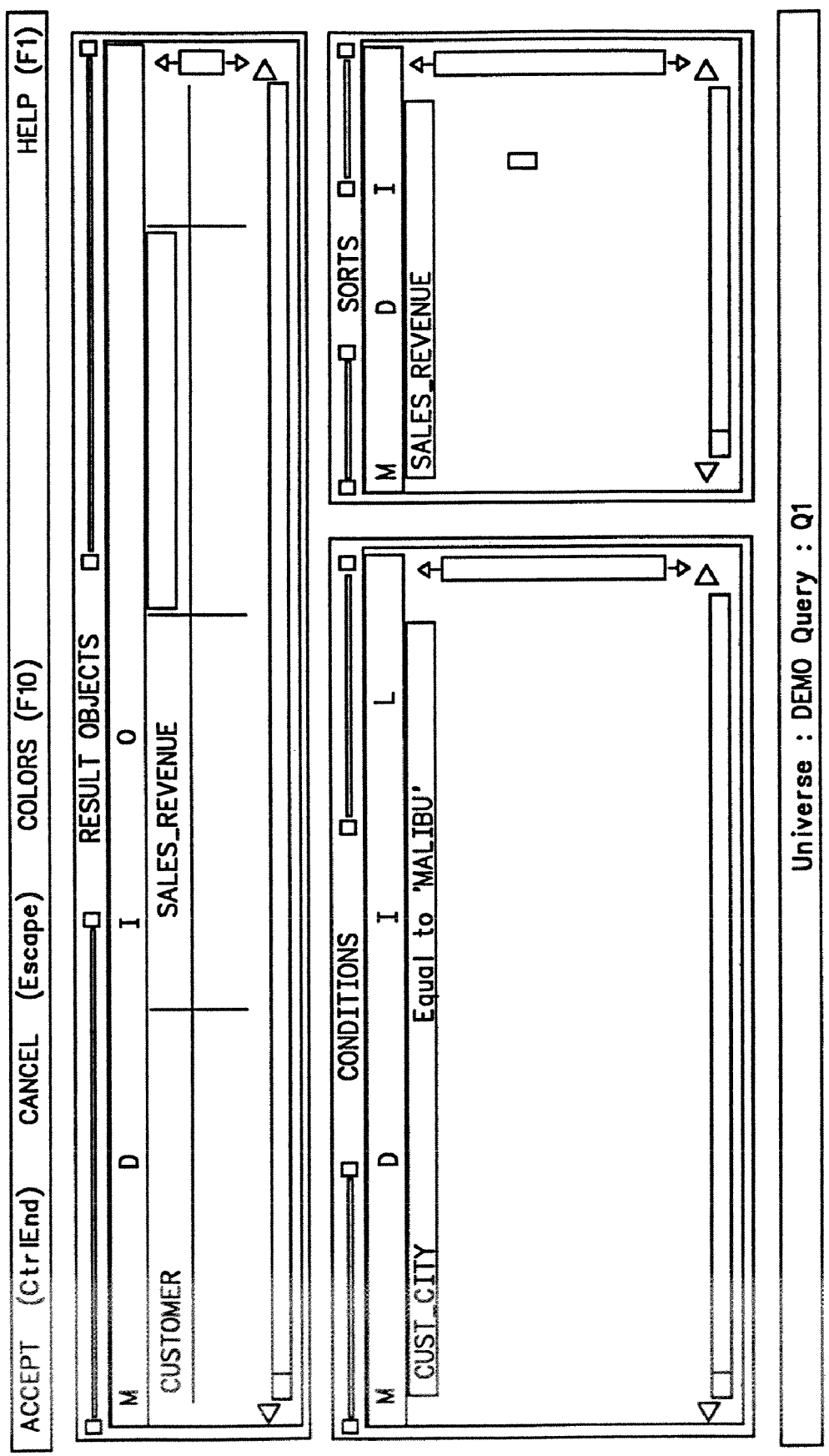
FIG. 22 depicts the final screen of the query definition.

FIG. 22 shows the final screen of the query definition.

Figure 23:
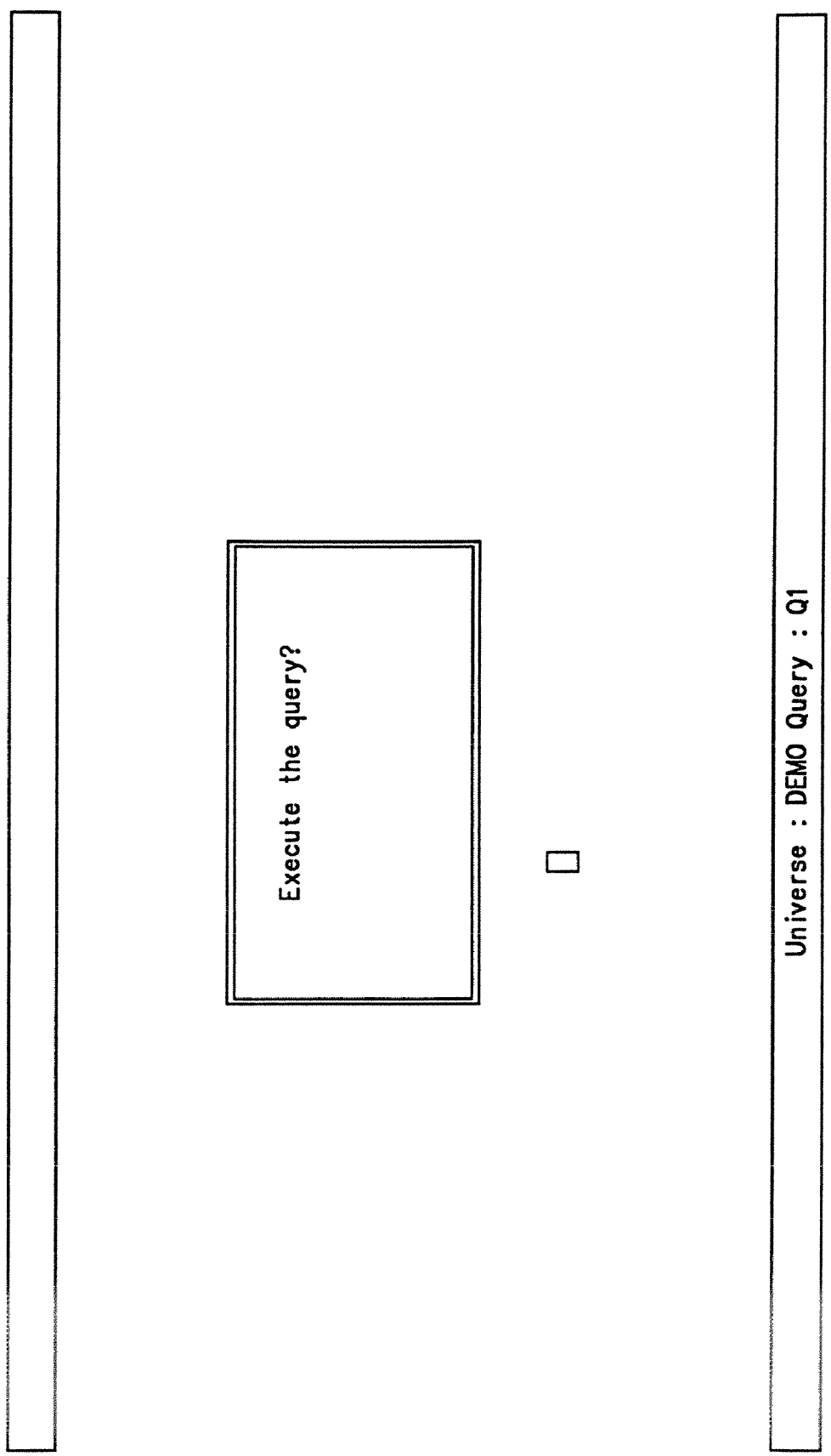
FIG. 23 depicts the SQL equivalent to the Query On Business Objects definition and prompt the user to execute the query.

In FIG. 23, the Query Engine generates the SQL equivalent to the Query on Business Objects definition and prompts the user to execute the query. The connection to the remote database will then occur.

In FIG. 24, the Query Engine displays the result. The answer is a tabular data representation.

FIG. 25 shows that users can check the SQL command generated automatically by the Query Engine.

Figure 26:
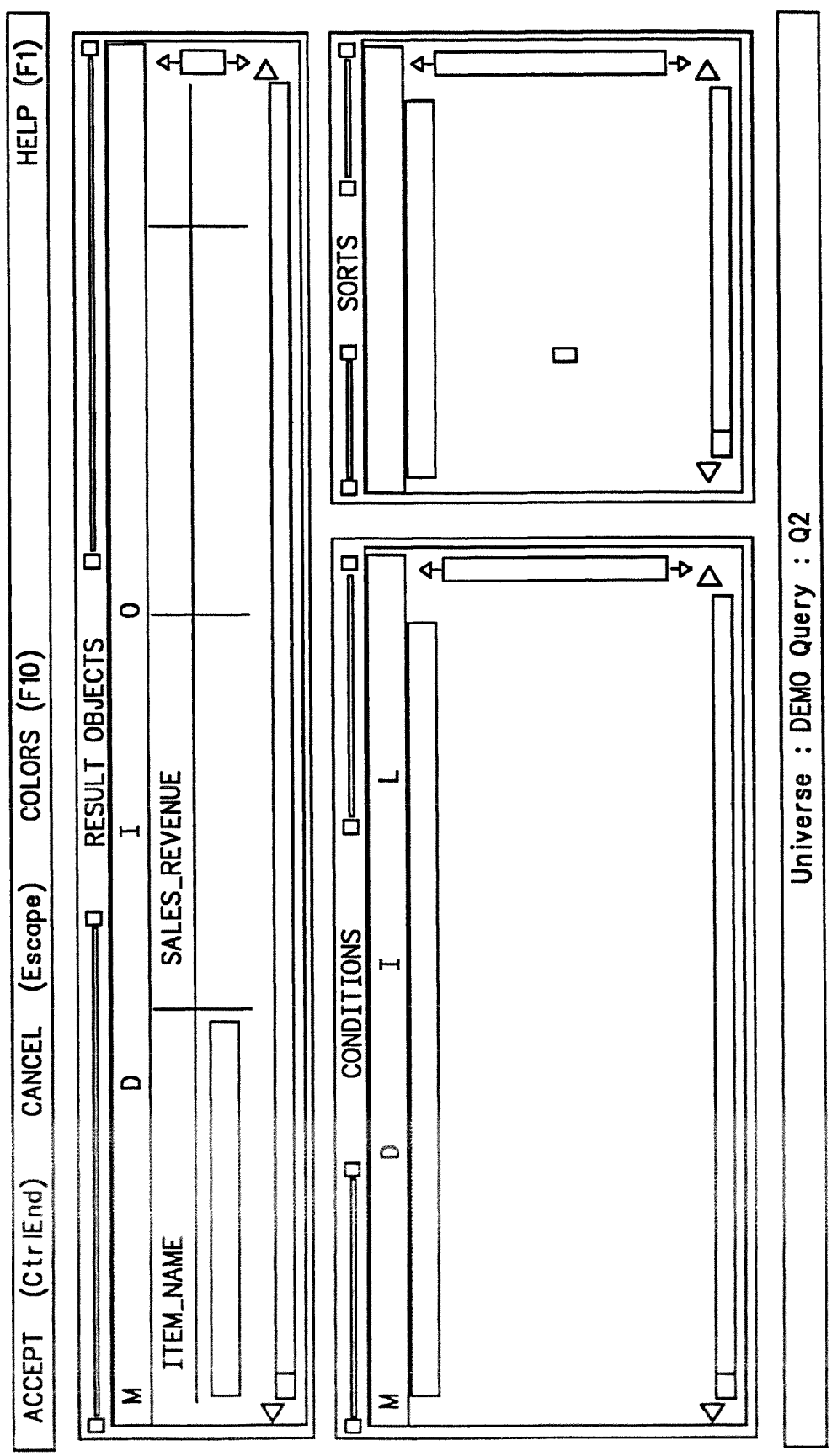
FIG. 26 depicts another query definition screen.

FIG. 26 shows another query definition screen. The Sales Revenue Object is associated with another Object called Item Name. The meaning of this object is different, while the Sales Revenue Object is the same.

FIG. 27 shows the display of the answer of the query "Sales revenue by Item".

FIG. 28 shows that the SQL command generated by the Query Engine to translate the question "Sales revenues per items".

Figure 29:
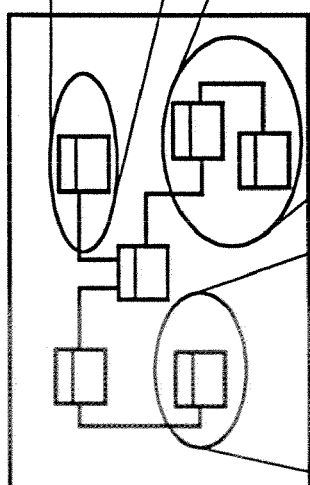
FIG. 29 depicts a Universe of Objects with total or partial representation of a database for a particular group of users or for a particular function in the present invention.

FIG. 29 illustrates a Universe of Objects with total or partial representation of a database for a particular group of users or for a particular function. Such Universe of Objects could include personnel (employee salary, commission), commercial (customer sales revenue, item, item price and order date), and inventory (warehouses, current inventory, out-of-stock items).

Figure 30:
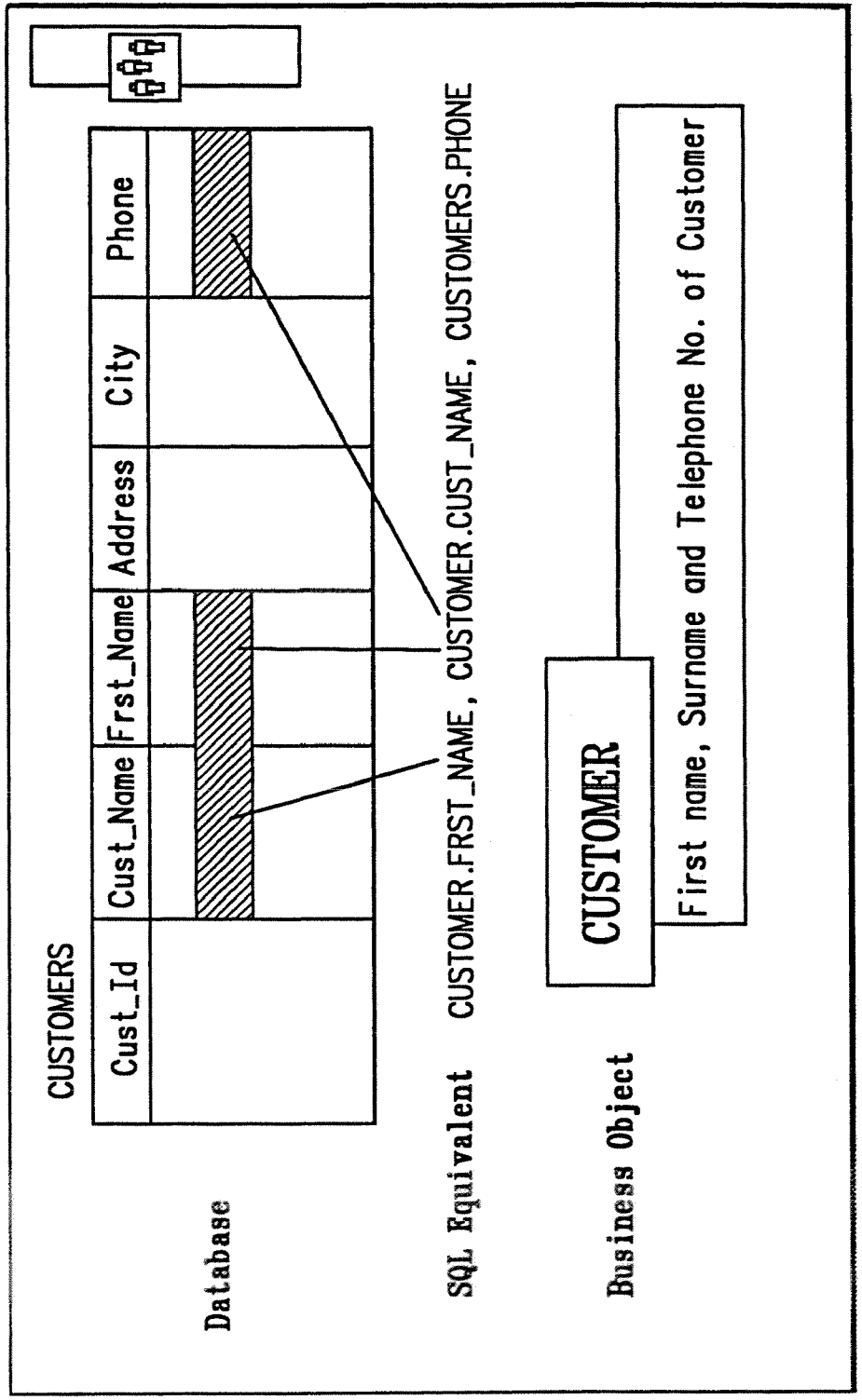
FIG. 30 depicts Customer Object as compared to the SQL equivalent.
Figure 31:
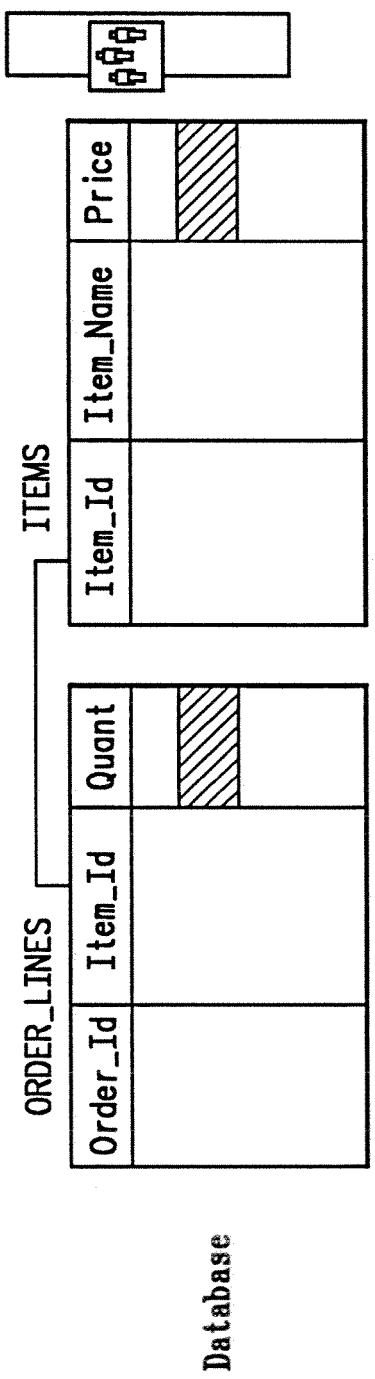
FIG. 31 depicts Sales Revenue Object with its corresponding SQL equivalent.

FIGS. 30 and 31 illustrate Business Objects as compared to the SQL equivalent. In FIG. 30 the customer object is illustrated, and in FIG. 31 the sales revenue object is illustrated with its corresponding SQL equivalent.

The access technology of the present invention utilizing a Query on Business Objects, provides for manipulation of objects with semantically dynamic aspects and a natural query structure of objects, conditions and sorts. Hence, the user does not need to know the SQL language and does not need to know the structure of the database in terms of column and table names, joins, group functions and the like.

Figure 33:
FIG. 33 depicts the Query on Business Objects aspects of being semantically dynamic as shown by query sales revenue by item as contrasted with the SQL equivalent.

FIGS. 32 and 33 illustrate the Query on Business Objects aspects of being semantically dynamic. FIG. 32 illustrates the query sales revenue by customer as contrasted with the SQL equivalent. FIG. 33 illustrates the query sales revenue by item, again compared with the SQL equivalent. The Query Engine of the present invention allows the interrogation of more than simple objects which includes the combination of fields, calculations of fields, and aggregates (sum, averages and the like). The Query Engine allows complex conditions on complex objects with complex combinations (AND, OR, and the like). This provides the end user with the power of an SQL language, however, the Query on Business Objects generates all the elements of the SQL query using the Query Engine.

Figure 34:
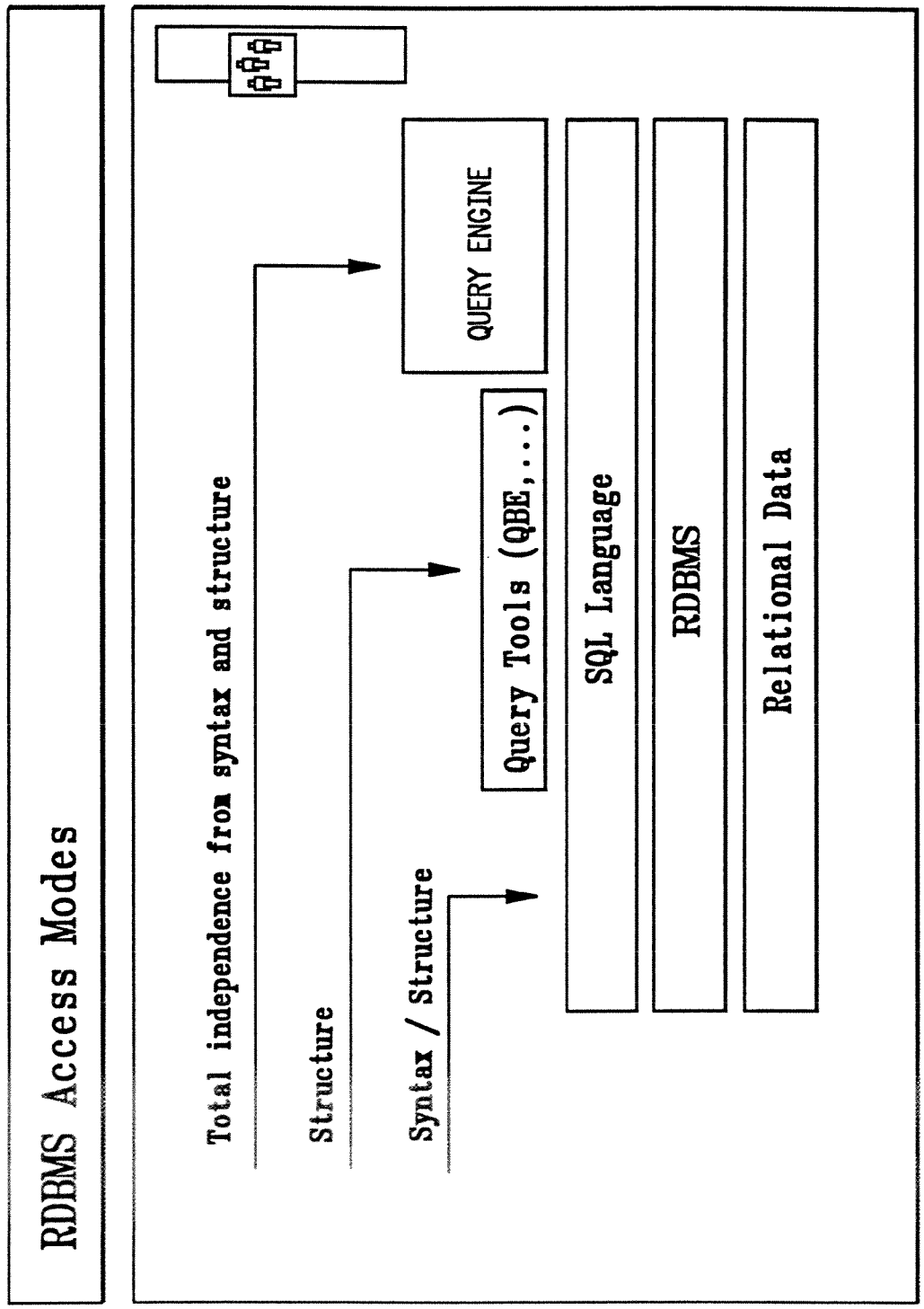
FIG. 34 depicts the RDBMS access modes.

FIG. 34 illustrates the RDBMS access modes which show the total independence from syntax and structure from the Query Engine of the present invention, whereas the syntax/structure and structure aspects of prior art approaches are also shown.

The present invention provides for local data analysis as shown in FIG. 35 which provides horizontal and vertical browsing, report generation in terms of tables, labels, form letters; graph generation such as bar charts, 2-D, 3-D; pie charts and sets of points; and exploitation by standard packages such as spreadsheets, wordprocessors, and databases.

FIG. 36 illustrates the user friendly interface aspects of the present invention, which provides easy to use interface that conforms to PC standards, interactions possible with a mouse, and the like.

Figure 37:
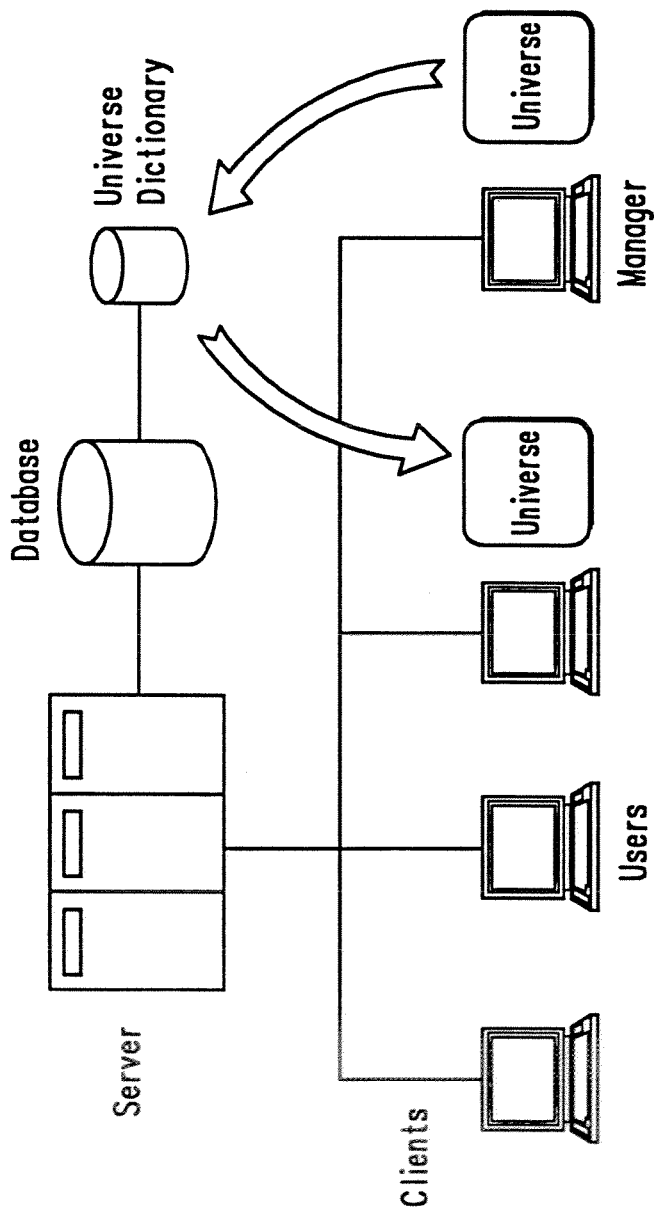
FIGS. 37 depicts distribution of universes and objects according to the present invention.
Figure 38:
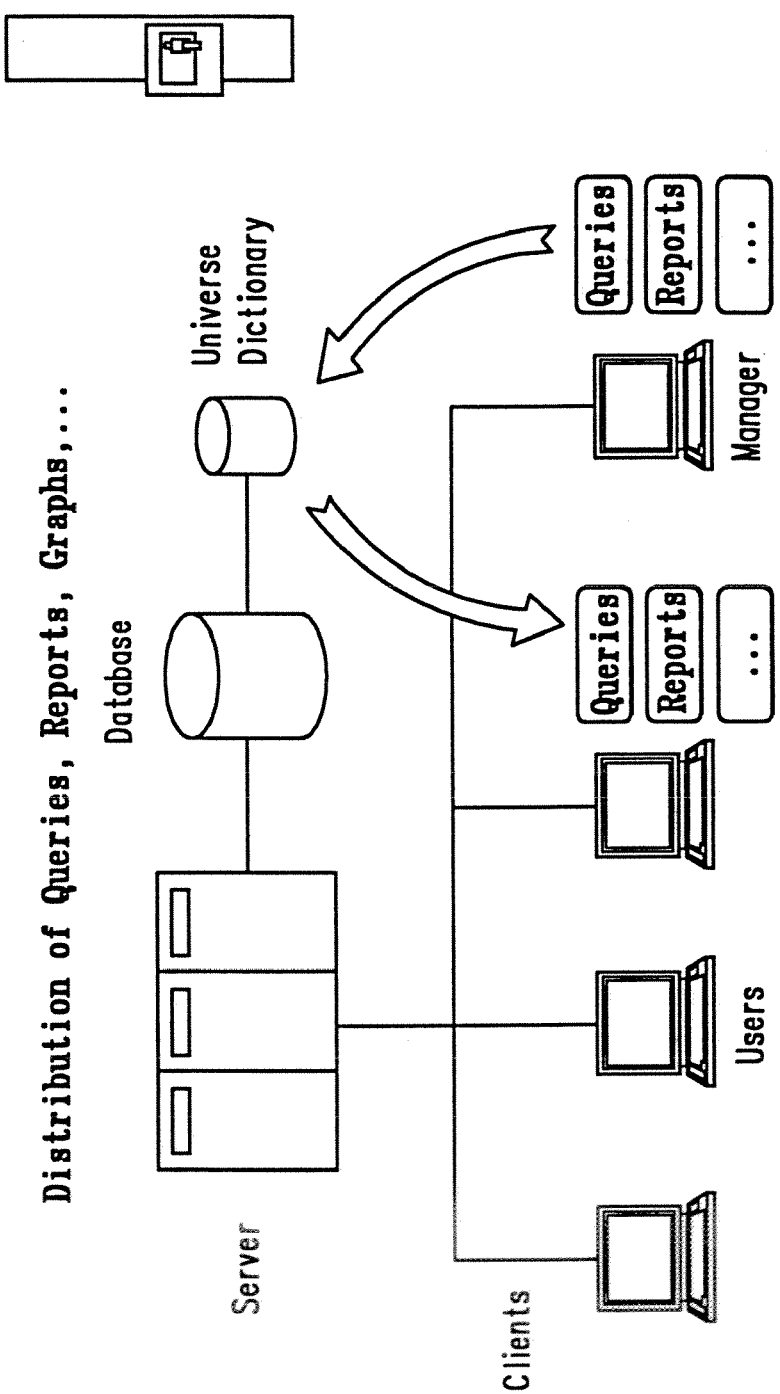
FIG. 38 depicts distributions of queries, reports, graphs and the like according to the present invention.

FIGS. 37 and 38 illustrate distribution of universes and objects (FIG. 37) and distributions of queries, reports, graphs and the like (FIG. 38) according to the present invention.

A relational database access system and method has been shown and described. The present invention provides a representation of a relational database by a Universe of Objects which comprises classes, objects, joins, and contexts.

A Business Object has been defined as a name, some elements of a Select cause, and some elements of a Where clause.

The dynamic semantics of an Object are such that the data behind such an Object (i.e., its meaning), differs according to other Objects that are part of a Query.

The Query Technique of the present invention allows a user to implicitly define the semantics of the Object in a Query where the user associate the Objects together.

A context has been defined as a set of joins without loops. The choice of a context manually by a user or automatically by the present invention determines the meaning of the Objects in a Query in case of ambiguity.

The automatic generation of joins by the present invention is such that it generates all the elements of an SQL statement automatically, which defines all the joins and the temporary tables needed to create a correct statement. If there is a potential ambiguity in the choice of the joins, the present invention chooses a context (a consistent set of joins) or proposes authorized context to the user.

The present invention hence allows users to work with their own familiar business words and terminology and allows users to access to relational databases without being required to possess any knowledge of the structure of the database or the specific names of its physical elements.

Also, the present invention insulates users from having to know the data access language such as SQL.

The present invention further allows the creation of simple or complex Business Objects that relate to the data and database structures.

The present invention allows the dynamic manipulation of those Objects in an ad hoc manner, and provides a level of safety and data integrity by assuring that the correct data will be accessed and displayed.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use con-templated. The present invention has been described in a relational database environment. However, the present invention has applications to other databases such as network, hierarchical, or object oriented databases. Therefore, it is intended that the scope of the invention be defined by the Claims appended hereto and their equivalents.

What is claimed is:

1. A hardware computer storage device with computer executable instructions for accessing a database, comprising executable instructions to:
   present a user at a client computer with a set of business objects, wherein the business objects include familiar terms corresponding to information about the structure of the database;
   receive a plurality of selected business objects;
   generate a SQL query from the selected business objects, wherein the SQL query includes a SELECT clause and a FROM clause, wherein the selected business objects are associated with a selected context that includes a list of joins between tables that gives meaning to the selected business objects, wherein the selected context is chosen from several contexts applicable to the SQL query;
   receive a condition used to restrict the scope of values returned from the database;
   translate the condition into a WHERE clause in the SQL query;
   transmit the SQL query to the database; and
   receive a tabular result set.

2. The hardware computer storage device of claim 1 wherein the FROM clause includes a list of tables associated with selected business objects.

3. The hardware computer storage device of claim 1 further comprising executable instructions to:
   define a list of joins between tables in the database to characterize a set of linked tables, wherein a join is a relational synchronization between tables;
   add a union of the set of linked tables to the FROM clause if the set of linked tables is linked by one path;
   add a union of the set of linked tables along a particular path defined by the selected context to the FROM clause if the set of linked tables are linked by multiple paths, wherein the selected context includes a set of joins including all of the tables in the set of linked tables; and
   add a union of the set of linked tables arranged along all joins in the list of joins to the FROM clause if the set of linked tables is linked by multiple paths but no context exists.

4. The hardware computer storage device of claim 2 wherein the meaning given to the selected business objects by the selected context is established by a path without a loop between a first table and a second table in the list of tables.

5. The hardware computer storage device of claim 3 further comprising executable instructions to propose different contexts to a user.

6. The hardware computer storage device of claim 3 wherein the condition includes a set of elementary and linking logic, including:
   a first elementary condition with a first condition business object, a first operator and a first operand,
   a second elementary condition including a second condition business object, a second operator and a second operand; and
   a complex combination linking the first elementary condition and the second elementary condition.

7. The hardware computer storage device of claim 6 wherein the executable instructions to translate the condition into a WHERE clause include executable instructions to: generate a list of joins for the selected context linked by an AND operator; and replace the set of elementary conditions and linking logic by SQL equivalents.

8. The hardware computer storage device of claim 6 further comprising executable instructions to perform data analysis on the tabular result set.

9. A hardware computer storage device with computer executable instructions for accessing a database, comprising executable instructions to:
   present a user at a client computer with a set of business objects, wherein the business objects include familiar terms corresponding to information about the structure of the database;
   receive a plurality of selected business objects;
   generate a SQL query from the selected business objects, wherein the SQL query includes a SELECT clause and a FROM clause, wherein the FROM clause includes a list of tables associated with selected business objects;
   receive a selection of a context from several contexts applicable to the SQL query; wherein the selected context includes a list of joins between tables that give meaning to the selected business objects;
   receive a condition used to restrict the scope of values returned from the database;

translate the condition into a WHERE clause in the SQL query; and transmit the SQL query to the database.

10. The hardware computer storage device of claim 9 wherein the context gives meaning to the selected business objects.

11. The hardware computer storage device of claim 9 further comprising executable instructions to:
- define a set of linked tables with the list of tables and the list of joins, wherein a join is a relational synchronization between tables;
- add the set of linked tables to the FROM clause if the set of linked tables is linked by one path;
- add the set of linked tables along a particular path defined by the selected context to the FROM clause if the set of linked tables are linked by multiple paths, wherein the context is a set of joins including all of the tables in the set of linked tables; and
- add the set of linked tables arranged along all joins in the list of joins to the FROM clause if the set of linked tables is linked by multiple paths but no context exists.

12. The hardware computer storage device of claim 9 further comprising executable instructions to receive a tabular result set.

13. The hardware computer storage device of claim 11 further comprising executable instructions to propose a different context.

14. The hardware computer storage device of claim 11 wherein the condition includes a set of elementary and linking logic, including:
- a first elementary condition with a first condition business object, a first operator and a first operand,
- a second elementary condition including a second condition business object, a second operator and a second operand; and
- a complex combination linking the first elementary condition and the second elementary condition.

15. The hardware computer storage device of claim 11 wherein the executable instructions to translate the condition into a WHERE clause include executable instructions to:
- generate a list of joins for the selected context linked by an AND operator; and
- replace the set of elementary conditions and linking logic by SQL equivalents.

* * * * *